(12) United States Patent
Ungerank et al.

US010040036B2

(10) Patent No.: US 10,040,036 B2
(45) Date of Patent: Aug. 7, 2018

(54) HIGHLY-SELECTIVE POLYIMIDE MEMBRANES WITH INCREASED PERMEANCE, SAID MEMBRANES CONSISTING OF BLOCK COPOLYIMIDES

(71) Applicants: Markus Ungerank, Perg (AT); Harald Roegl, Wallern an der Trattnach (AT)

(72) Inventors: Markus Ungerank, Perg (AT); Harald Roegl, Wallern an der Trattnach (AT)

(73) Assignee: EVONIK FIBRES GmbH, Schoerfling am Attersee (AT)

( * ) Notice: Subject to any disclaimer, the term of this patent is extended or adjusted under 35 U.S.C. 154(b) by 61 days.

(21) Appl. No.: 15/106,037

(22) PCT Filed: Dec. 10, 2014

(86) PCT No.: PCT/EP2014/077118
§ 371 (c)(1),
(2) Date: Jun. 17, 2016

(87) PCT Pub. No.: WO2015/091122
PCT Pub. Date: Jun. 25, 2015

(65) Prior Publication Data
US 2016/0317981 A1   Nov. 3, 2016

(30) Foreign Application Priority Data
Dec. 17, 2013 (EP) .................... 13197853

(51) Int. Cl.
| | | |
|---|---|---|
| *B01D 71/64* | (2006.01) | |
| *B01D 53/22* | (2006.01) | |
| *B01D 69/02* | (2006.01) | |
| *B01D 69/08* | (2006.01) | |
| *C08G 73/10* | (2006.01) | |
| *C08G 18/64* | (2006.01) | |
| *C08G 18/76* | (2006.01) | |
| *B01D 71/80* | (2006.01) | |
| *C08L 79/08* | (2006.01) | |

(52) U.S. Cl.
CPC .......... *B01D 71/64* (2013.01); *B01D 53/228* (2013.01); *B01D 69/02* (2013.01); *B01D 69/08* (2013.01); *B01D 71/80* (2013.01); *C08G 18/6438* (2013.01); *C08G 18/7607* (2013.01); *C08G 18/7621* (2013.01); *C08G 18/7671* (2013.01); *C08G 73/1021* (2013.01); *C08G 73/1032* (2013.01); *C08G 73/1035* (2013.01); *C08G 73/1042* (2013.01); *C08G 73/1067* (2013.01); *C08L 79/08* (2013.01); *B01D 2325/022* (2013.01); *B01D 2325/34* (2013.01)

(58) Field of Classification Search
CPC ...... B01D 53/228; B01D 69/02; B01D 69/08; B01D 71/64; B01D 71/80; C08G 18/6438; C08G 18/7607; C08G 18/7621; C08G 18/7671; C08G 73/1021; C08G 73/1032; C08G 73/1035; C08G 73/1042; C08G 73/1067
See application file for complete search history.

(56) References Cited

U.S. PATENT DOCUMENTS

| | | | | |
|---|---|---|---|---|
| 3,822,202 | A  * | 7/1974 | Hoehn ................ | B01D 71/64 210/500.1 |
| 4,880,442 | A  * | 11/1989 | Hayes .................. | B01D 71/64 95/51 |
| 9,770,687 | B2 * | 9/2017 | Ungerank ............ | B01D 53/228 |
| 2004/0159233 | A1 * | 8/2004 | Simmons ............. | B01D 53/228 95/45 |
| 2006/0156920 | A1 * | 7/2006 | Ekiner ................. | B01D 53/228 95/45 |
| 2009/0143541 | A1 * | 6/2009 | Rogl ................... | C08G 73/1042 525/432 |
| 2010/0269698 | A1 * | 10/2010 | Yates .................. | B01D 53/228 96/10 |
| 2012/0123079 | A1 | 5/2012 | Ungerank et al. | |
| 2012/0223014 | A1 * | 9/2012 | Boam .................. | B01D 71/64 210/644 |
| 2013/0098242 | A1 | 4/2013 | Ungerank et al. | |
| 2015/0005468 | A1 * | 1/2015 | Osman ................ | B01D 71/64 528/170 |

FOREIGN PATENT DOCUMENTS

| | | |
|---|---|---|
| WO | WO2006057036 | 6/2006 |
| WO | 2007/009652 A1 | 1/2007 |
| WO | 2011/009919 A1 | 1/2011 |
| WO | 2012/000727 A1 | 1/2012 |

OTHER PUBLICATIONS

M. Niwa, et al., "Preparation of Novel Fluorinated Block Copolyimide Membranes for Gas Separation," Journal of Applied Polymer Science, vol. 100, XP002725720, 2006, pp. 2436-2442.
International Search Report dated Feb. 16, 2015 in PCT/EP2014/077118 filed Dec. 10, 2014.
European Search Report dated Jun. 12, 2014 in EP 13197853.8 filed Dec. 17, 2013.
Office Action dated Mar. 19, 2018, in Japanese Patent Application No. 2016-541408.

* cited by examiner

*Primary Examiner* — Jason M Greene
(74) *Attorney, Agent, or Firm* — Oblon, McClelland, Maier & Neustadt, L.L.P.

(57) ABSTRACT

The present invention relates to novel block copolyimides for preparing highly selective integrally asymmetrical gas separation membranes of improved permeance, processes for preparing these block copolyimides, membranes prepared from the block copolyimides, and also the use of the block copolyimides and of the membranes prepared therefrom.

19 Claims, No Drawings

HIGHLY-SELECTIVE POLYIMIDE MEMBRANES WITH INCREASED PERMEANCE, SAID MEMBRANES CONSISTING OF BLOCK COPOLYIMIDES

The present invention relates to novel block copolyimides for preparing highly selective integrally asymmetrical gas separation membranes of improved permeance, processes for preparing these block copolyimides, membranes prepared from the block copolyimides, and also the use of the block copolyimides and of the membranes prepared therefrom.

Polyimides are known, for example from WO 2011/009919, to be very selective polymers in the separation of gases. However, their permeability is but moderate, which limits commercial utility in uses having high area requirements in particular.

It would accordingly be desirable to increase the permeability of polyimide membranes without sacrificing their existing positive properties, such as high thermal stability and high selectivity.

An attempt to increase the permeability of polyimide membranes involved the preparation of random copolymers from the selective polymer. It transpired, however, that the selectivity decreases continuously and usually linearly with the addition of any new monomeric component.

Another way to enhance the permeability of a membrane material is to admix some other polymer by preparing a blend. The admixed polymer is chosen for its distinctly higher permeability. However, it has to be accepted here that the admixed polymer will generally be less selective. A further disadvantage is that, in most cases, polymers in solution are not homogeneously miscible with one another across a wide concentration range, so phase separation will occur in many cases. An emulsion forms in the process. The droplet size of the emulsion is above 1 µm and therefore exceeds the normal 10 to 50 nm thickness of the actively separating layer of an integrally asymmetrical membrane, reducing the selectivity in turn. Blends are further limited to miscible systems, severely curbing user choice.

Nor did the incorporation of additives such as, for example, zeolites or metal organic frameworks (MOFs) hitherto prove successful with commercial membranes, since the particle size of the additives usually exceeds the 10 to 50 nm layer thickness of a commercial integrally asymmetrical membrane. Thicker membranes, in turn, nullify the intrinsically higher permeability advantage of the filled membrane material because of the higher layer thickness needed.

A further approach to improving the permeability of polyimide membranes was proposed by M. Niwa et al., J. of Appl. Pol. Science, Vol. 100, 2436-2442, 2006. He used a block copolyimide comprising two fluorinated polyimide blocks to prepare gas separation foils. He found that foil permeability to $CO_2/CH_4$ did improve over that of the corresponding homopolymers according to block length, but selectivity was significantly down. Niwa never prepared integrally asymmetrical hollow fiber membranes.

Further attempts to prepare membranes from block copolyimides are found in US 2010/0313752, U.S. Pat. No. 5,202,411, U.S. Pat. No. 5,094,919, U.S. Pat. No. 5,130,017, U.S. Pat. No. 6,252,038 and JP 6-071148. None of the block copolymers described therein has hitherto been commercialized.

Block copolymers from polyimides are inter alia also described in WO 2007/009652. However, as related in said WO 2007/009652 at page 7, 3rd paragraph, the block copolymers described therein always have an insoluble block B, i.e., the monomers of block B are selected from the lists in said WO 2007/009652 such that said block becomes insoluble. The insoluble block copolymers are employed in said WO 2007/009652 as powders in the manufacture of heat- and chemical-resistant moldings, for example in the hot-compression molding process. Membranes cannot be made from these powders, since absent solubility on the part of said block copolymers it is impossible to prepare any casting solution.

Permeability and selectivity, as noted above, are conflicting objectives. High permeabilities are associated with comparatively low selectivities, and vice versa. A Robeson plot describes this association. The combination of permeability and selectivity is also known as permselectivity.

It is clear from the above remarks that there is still an immense need of polymers for gas separation membranes of enhanced permselectivity/productivity.

The present invention thus has for its object to provide novel polymers where the disadvantages of prior art polymers are absent or reduced. A process for their preparation shall further be provided.

It is a specific object of the present invention that the novel polymers shall be useful for preparing gas separation membranes, in particular integrally asymmetrical gas separation membranes and very particularly those having low layer thicknesses.

It was likewise a specific object of the present invention to prepare polymers from inexpensive monomers available on a large industrial scale and thus also to provide economically advantageous membranes.

It is a further specific object of the present invention to provide an inexpensive process for preparing the membranes.

The membranes of the present invention shall provide a very high level of productivity.

Further objects, not explicitly mentioned, will become apparent from the overall context of the ensuing description, examples and claims.

The inventors have now found that, surprisingly, the abovementioned objects are achieved by a block copolyimide according to Claim 1 and also by the processes for preparing same which are claimed in Claim 5 or 10.

It has been determined that the block copolyimide of the present invention can be used for preparing integrally asymmetrical membranes for gas separation. Membranes of this type preferably have but a very thin active separating layer, in particular in the range from 10 to 50 nm.

The block copolymers of the present invention form domains of the second polymer block in the matrix of the first polymer block. It has now been determined that, surprisingly, the domain size can be made very small, i.e. smaller than the thickness of the active separating layer. This enhances the permeability of a membrane prepared from the block copolyimides of the present invention whilst selectivity is retained. The polymers and membranes of the present invention thus have immense advantages over the prior art membranes where the domain size—as described above—is greater than the thickness of the active separating layer of an integrally asymmetrical membrane and where there is accordingly a distinct decrease in selectivity due to domain formation.

The polymers and membranes of the present invention are further advantageous in that they can be prepared in a very cost-effective manner. This is firstly because inexpensive monomers available on a large industrial scale are used. Secondly, however, this is also because the polymer blocks are such that the resulting block copolyimide is soluble in a solvent typically used for preparing integrally asymmetrical membranes. The inventors succeeded in preparing the membranes directly from the polymer solution formed in the preparation of the block copolyimides. No solvent exchange is needed, nor does the block copolyimide of the present invention have to be isolated and redissolved. Several operations are accordingly eliminated.

The present invention accordingly provides block copolymers according to Claim 1 and processes for preparation thereof according to Claim 5 or 10. The invention further provides membranes prepared from the polymers of the present invention, in particular according to Claim 11, gas separation assemblies comprising the membranes of the present invention and processes for separating gases by using the membranes of the present invention.

The present invention will now be described in detail.

The inventors found that when two immiscible polymers—corresponding to the blocks in Claim 1—are attached to each other covalently, a microphase separation takes place to solve the abovementioned problems.

The present invention provides a highly selective block copolymer comprising, preferably consisting of, the blocks (A) and (B) as per the ensuing formulae (Ia) and (Ib).

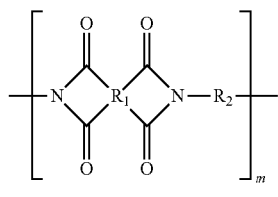

Block A (Ia)

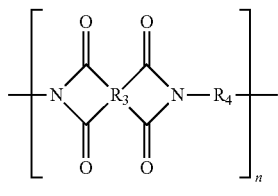

Block B (Ib)

Said blocks A and B have a differing composition, i.e. the pairs $R_1$ and $R_3$ on the one hand and $R_2$ and $R_4$ on the other cannot each be identical at one and the same time.

The block copolyimide comprises a continuous phase of block (A). The functional group $R_1$ therein comprises either or both of the following functional groups:

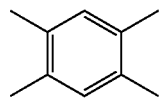

R1a

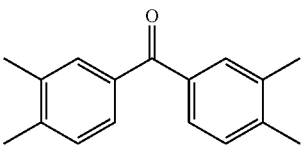

R1b

Preferably $R_1$ comprises in total >50 mol %, preferably ≥70 mol %, more preferably ≥80 mol %, yet more preferably from 90 to 100 mol %, yet still more preferably from 95 to 100 mol % and most preferably 100 mol % of groups $R_1a$ and $R_1b$, and also any further tetravalent, aromatic, functional groups.

More preferably, $R_1$ consists of 0 to 100 mol % $R_1a$ and 0 to 100 mol % $R_1b$, more preferably of 0 to 80 mol % $R_1a$ and 100 to 20 mol % $R_1b$, most preferably of 0 to 40 mol % $R_1a$ and 100 to 60 mol % $R_1b$ and most preferably of $0 \leq R_1a \leq 50$ mol % and $100 \geq R_1b \geq 50$ mol %, wherein the mole percentages of the functional groups $R_1a$ and $R_1b$ are in each case chosen within the recited ranges such that they total 100 mol % of functional groups $R_1$.

$R_2$ comprises at least one or 2 or 3 of the following functional groups

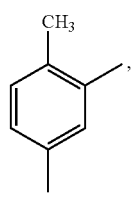

R2a

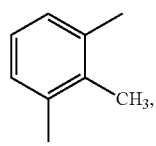

R2b

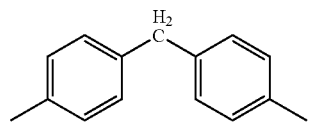

R2c

Preferably $R_2$ comprises in total >50 mol %, preferably ≥70 mol %, more preferably ≥80 mol %, yet more preferably from 90 to 100 mol %, yet still more preferably from 95 to 100 mol % and most preferably 100 mol % of groups $R_2a$, $R_2b$ and/or $R_2c$ and any further divalent, aromatic, functional groups, preferably divalent aromatic groups substituted in ortho position with a $C_1$-$C_4$ alkyl radical, preferably $CH_4$.

More preferably, $R_2$ consists of 0 to 100 mol % $R_2a$ and 0 to 100 mol % $R_2b$ and 0 to 100 mol % $R_2c$, yet more preferably of 40 to 100 mol % $R_2a$ and 0 to 60 mol % $R_2b$ and 0 to 60 mol % $R_2c$, most preferably of 50 to 90 mol % $R_2a$ and 10 to 50 mol % $R_2b$ and 0 to 40 mol % $R_2c$, wherein the mole percentages of the functional groups $R_2a$, $R_2b$ and $R_2c$ are in each case chosen within the recited ranges such that they total 100 mol % of functional groups $R_2$.

Preferably, the functional groups $R_2a$ and $R_2b$ are present together at 50 to 100 mol %, more preferably at 60 to 100 mol %, and most preferably at 70 to 100 mol %, while $R_2c$ is present at 0 to 50 mol %, more preferably at 0 to 40 mol % and most preferably at 0 to 30 mol %, wherein the mole percentages of the functional groups are in each case chosen within the recited ranges such that they total 100 mol % of functional groups $R_2$.

Block (A) has the following compositions in embodiments that are most preferable:

AF1: 100 mol % $R_1b$ and also 64 mol % $R_2a$, 16 mol % $R_2b$ and 20 mol % $R_2c$.

AF2: 40 mol % $R_1a$, 60 mol % $R_1b$ and also 80 mol % $R_2a$, 20 mol % $R_2b$.

The recited mole percentages relate to the functional groups $R_1$ and $R_2$ such that the amounts of the various units are each selected such that the sum total is 100 mol % for each of these groups.

The present invention also comprehends embodiments comprising two or more different blocks (A). The various (A) blocks may differ in the composition of the functional groups for example.

Block (B) is elected to be a polymer that is distinctly more permeable than block (A), that is soluble in an aprotic dipolar solvent such as preferably dimethylformamide (DMF), dimethylacetamide (DMAc) or N-methylpyrrolidinone (NMP) or the like, and that is not miscible with a solution of the oligomer/polymer as per block (A) in the particular solvent. Phase separation is apparent from some cloudiness on the part of the mixture of the two homopolymers/oligomers (A) and (B) in the particular solvent. Domains of an emulsion are visible under the microscope.

$R_3$ in block (B) comprises at least one or more of the following functional groups:

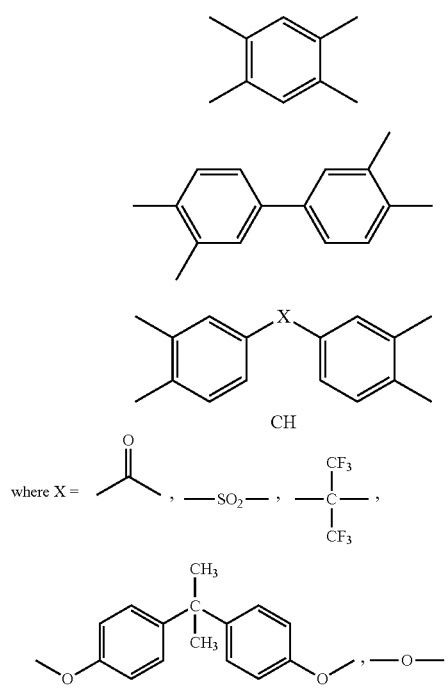

Preferably $R_3$ comprises in total >50 mol %, preferably ≥60 mol %, more preferably ≥70 mol %, yet more preferably from 80 to 100 mol %, yet still more preferably from 90 to 100 mol % and most preferably 100 mol % of the groups $R_3a$, $R_3b$ and/or $R_3c$ and also of any further tetravalent aromatic functional groups.

More preferably, $R_3$ consists of 0 to 100 mol % $R_3a$ and/or 0 to 100 mol % $R_3b$ and/or 0 to 100 mol % $R_3c$, yet more preferably of 30 to 100 mol % $R_3a$ and/or 0 to 40 mol % $R_3b$ and 30 to 100 mol % $R_3c$ or, respectively, yet still more preferably of 0 to 75 mol % $R_3a$ and/or 0 to 75 mol % $R_3b$ and 25 to 100 mol % $R_3c$, yet still even more preferably of 0 to 60 mol % $R_3a$ and 0 to 15 mol % $R_3b$ and 100 to 25 mol % $R_3c$ and most preferably of 25 to 75 mol % $R_3a$ and 75 to 25 mol % $R_3c$, wherein the mole percentages of the functional groups $R_3a$, $R_3b$ and $R_3c$ are in each case chosen within the recited ranges such that they total 100 mol % of functional groups $R_3$.

Particularly preferred dianhydrides for introducing the functional group $R_3$ are BTDA (3,3',4,4'-benzophenonetetracarboxylic dianhydride), PMDA (pyromellitic dianhydride), BPDA (3,3',4,4'-biphenyltetracarboxylic dianhydride), ODPA (4,4'-oxydiphthalic anhydride), BPADA (4,4'-bisphenol A dianhydride. CAS No. 38103-06-9), 6FDA (4,4'-(hexafluoroisopropylidene)diphthalic anhydrides).

R4 comprises at least one or more of the following functional groups

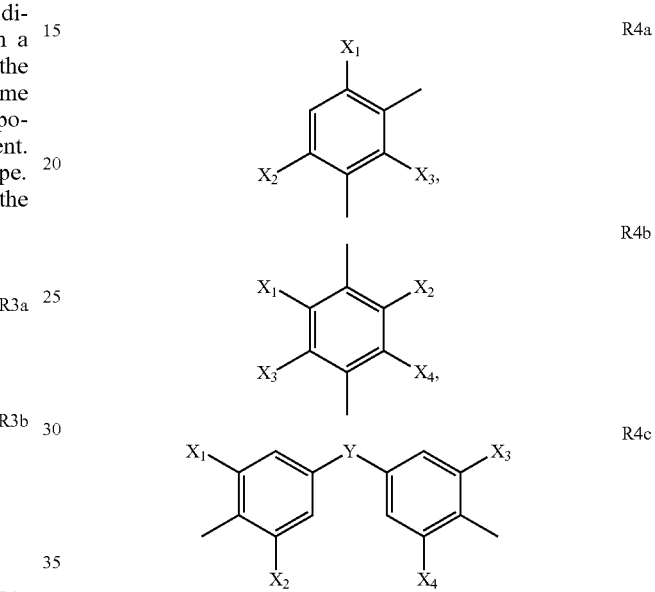

where $X_1$, $X_2$, $X_3$ and $X_4$ are either H or $CH_3$ or alkyl radicals with $C_2$ to $C_4$ and $Y = -CH_2-$, $-(CH_3)_2C-$, $SO_2$, $-(CF_3)_2C-$, $-CO-$, $-COO-$, $-CONH-$, $-O-$ wherein at least one of the radicals $X_1$ to $X_4$, preferably at least two of the radicals $X_1$ to $X_4$, more preferably at least three of the radicals $X_1$ to $X_4$ and most preferably all the radicals $X_1$ to $X_4$ are equal to $CH_3$ or a $C_2$ to $C_4$ alkyl radical.

Y in $R_{4c}$ is preferably $-CH_2-$, $-(CH_3)_2C-$, $-(CF_3)_2C-$ or O, more preferably Y=$-CH_2-$ or $-(CH_3)_2C-$. It is very particularly preferable for $R_4c$ to have the following composition: $X_1$, $X_2$ and $X_3$=H, $X_4$=$CH_3$ or a $C_2$ to $C_4$ alkyl radical and Y=$-CH_2-$ or $-(CH_3)_2C-$ or, respectively, $X_1$ and $X_3$=$CH_3$ or a $C_2$ to $C_4$ alkyl radical, $X_2$ and $X_4$=H or $CH_3$ and Y=$-CH_2-$ or $-(CH_3)_2C-$. It is most preferable for $R_4c$ to have the following composition: $X_1$, $X_2$, $X_3$ and $X_4$=$CH_3$ or a $C_2$ to $C_4$ alkyl radical and Y=$-CH_2-$ or $-(CH_3)_2C-$, preferably $-CH_2-$. It is most preferable for the radicals $X_1$ to $X_4$ in the abovementioned preferred embodiments to be $CH_3$ if they are not H.

Preferably $R_4$ comprises in total >50 mol %, preferably ≥65 mol %, more preferably ≥80 mol %, yet more preferably from 90 to 100 mol %, yet still more preferably from 95 to 100 mol % and most preferably 100 mol % of the units $R_4a$, $R_4b$ and/or $R_4c$ and of any further divalent aromatic functional groups, preferably divalent aromatic groups substituted in orthoposition with a $C_1$-$C_4$ alkyl radical, preferably $CH_3$.

More preferably, $R_4$ consists of 0 to 100 mol % $R_4a$ and/or 0 to 100 mol % $R_4b$ and/or 0 to 100 mol % $R_4c$, wherein the mole percentages of the functional groups $R_4a$, $R_4b$ and $R_4c$ are most preferably in each case chosen within the recited ranges such that they total 100 mol % of functional groups $R_4$. It is specifically preferable for $R_4$ to consist of 100 mol % $R_4a$ or 100 mol % $R_4c$. It is very specifically preferable for $R_4a$ where $X_1$, $X_2$ and $X_3=CH_3$ or $R_4c$ where $X_1$, $X_2$, $X_3$ and $X_4=CH_4$ or, respectively, $X_1$ and $X_3=CH_4$ and $X_2$ and $X_4=H$ and $Y=CH_2$ to be employed in the aforementioned cases.

In addition to the aforementioned B blocks, each of which contains only one $R_4a$ or $R_4c$ unit, particular preference is likewise given to those which contain at least two of said units $R_4a$, $R_4b$ and/or $R_4c$. It is particularly preferable in relation to $R_4b$ in particular that it should be employed in mixtures with $R_4a$ and/or $R_4c$, not alone. It is specifically preferable in those cases where at least two units $R_4a$, $R_4b$ or $R_4c$ are employed for $R_4$ to consist of $R_4a$ to an extent from 30 to 99 mol %, more preferably to an extent from 40 to 90 mol % and most preferably to an extent from 50 to 80 mol %, the balance to 100 mol % $R_4$ consisting in these cases of $R_4b$ and/or $R_4c$. It is very specifically preferable for $R_4a$ where $X_1$, $X_2$ and $X_3=CH_3$ or $R_4c$ where $X_1$, $X_2$, $X_3$ and $X_4=CH_4$ or, respectively, $X_1$ and $X_3=CH_4$ and $X_2$ and $X_4=H$ and $Y=CH_2$ to be employed in the aforementioned cases.

Block (B) preferably comprises a polymer/oligomer having—compared with block (A)—high permeability. It is accordingly advantageous to use very permeable polyimides in order that as little gas resistance may be caused in this phase as possible. Polyimides are always very permeable when they have a large free volume. A large free volume is always obtained on using aromatic functional groups $R_4$ which bear a group (usually methyl or a linear or branched alkyl radical with 2 to 4 carbon atoms) in the orthoposition relative to the nitrogen atom. This renders the system soluble and enhances the permeability. Preferred monomers for introducing the functional group $R_4$ in block (B) include MesDA (mesitylenediamine or 1,3,5-trimethyl-m-phenylenediamine), 1,2,4,5-tetramethyl-p-phenylenediamine or bis(3,5-dimethyl-4-aminophenyl)methane. Particularly preferred ones are R4a where $X_1$, $X_2$ and $X_3=CH_3$; R4a where $X_1$ and $X_2=H$ and $X_3=CH_3$, R4a where $X_2$ and $X_3=H$ and $X_1=CH_3$, $R_4b$ where $X_1$, $X_2$ $X_3$ and $X_4=CH_3$, and $R_4c$ where $X_1$, $X_2$ $X_3$ and $X_4=CH_3$ and $Y=CH_2$. Very particular preference is given to using MesDA.

A polyimide formed from BTDA/PMDA and MesDA has turned out to be a particularly preferable block (B). It is soluble in aprotic dipolar solvents, is not miscible in solution with block (A) of the present invention, has a high level of permeability and exhibits sufficient selectivity in the separation of gases.

In one particularly preferred embodiment, block (B) has the following composition:

AF3: 40 to 60 mol % $R_3a$, 0 to 10 mol % $R_3b$, 60 to 30 mol % $R_3c$ and also 90 to 100 mol % $R_4a$, 0 to 10 mol % $R_4b$ and 0 to 10 mol % $R_4c$.

Block (B) has the following compositions in the most preferable embodiments:

AF4: 50 mol % $R_3a$, 50 mol % $R_3c$ and also 100 mol % $R_4a$.

The mole percentages stated for AF3 and AF4 relate to the functional groups $R_3$ and $R_4$, respectively, in total, so the amounts of the various units are each selected such that they sum to 100 mol % for each of these groups.

Very particular preference is given to the combinations of the abovementioned AF1 and/or AF2 with AF3 and/or AF4. Combinations of AF1 or AF2 with AF4 are most preferable.

The present invention also comprehends embodiments comprising two or more different blocks (B). The various (B) blocks may differ in the composition of the functional groups, for example.

The block lengths n and m of blocks (A) and (B) are preferably in the range from 1 to 1000, more preferably in the range from 1 to 500, yet more preferably in the range from 1 to 200, yet still more preferably in the range from 5 to 150, yet still more preferably in the range from 10 to 100, yet still even more preferably in the range from 10 to 50 and most preferably in the range from 10 to 40. The block lengths of blocks (A) and (B) may be the same or different. The block copolyimide of the present invention may further exhibit some distribution with respect to the particular block lengths of blocks (A) and (B); that is, not all bocks (A) or all blocks (B) need to have the same length. The ratio between blocks (A) and (B) may thus be varied across a wide range, as shown in the inventive examples. Proportions in the block copolyimide of the present invention may be from 5 to 90% for block (B) and from 10 to 95% for block (A). Particular preference is given to the ratio of A:B=80:20 or 70:30 or 60:40 or 50:50 or most preferably 45:55.

The inventors have determined that the domain size can be controlled via the species of domains, i.e., their composition, and the block length.

The inventors further found that attainment of a certain molecular weight makes it possible to prepare hollow fiber membranes and flat sheet membranes having particularly good mechanical stabilities, so they can also be used in demanding technical applications. Insufficient molecular weights for the block copolyimide of the present invention may mean it is no longer possible to form films.

The molecular weight $M_n$ of the block copolyimide according to the present invention (based on polystyrene standards) is therefore preferably in the range from 10 000 to 200 000 g/mol, more preferably in the range from 20 000 to 150 000 g/mol, yet more preferably in the range from 20 000 to 120 000 g/mol and most preferably in the range from 30 000 to 100 000 g/mol.

The molecular weight $M_w$ of the block copolyimide according to the present invention (based on polystyrene standards) is therefore preferably in the range from 10 000 to 500 000 g/mol, more preferably in the range from 50 000 to 300 000 g/mol and most preferably in the range from 100 000 to 200 000 g/mol.

The polydispersity index is preferably in the range from 1 to 10, more preferably in the range from 1 to 5, yet more preferably in the range from 1 to 4, yet still more preferably in the range from 1.5 to 3.5 and most preferably in the range from 1.5 to 3. The polydispersity of the polymer affects particularly the viscosity of the solution from which the membranes are prepared. Broad molar mass distributions with a high proportion of comparatively high molecular weight polymers result in casting solutions having high viscosities at low solids contents. One consequence of this may be that the membranes do not have the desired separation properties as regards their selectivity.

Covalent attachment between the two blocks (A) and (B) of the block copolyimide according to the present invention first requires the preparation of a block having a reactive end group. Since polyimides are mostly prepared using functionalities such as dianhydrides, diamines or diisocyanates, these groups are preferably used as end groups.

In a first preferred embodiment of the process according to the present invention, the polymer block (B) with the comparatively high permeability is initially prepared with a certain block length and an appropriate reactive end group. This block is then used together with the other monomers and/or end-functionalized oligomers/polymers of block (A) to prepare a solution from which a soluble block copolyimide is then polymerized in situ by the isocyanate process. An overview of the first part of this process, i.e. the preparation of block (B), is shown in the following Scheme 1:

Scheme 1:

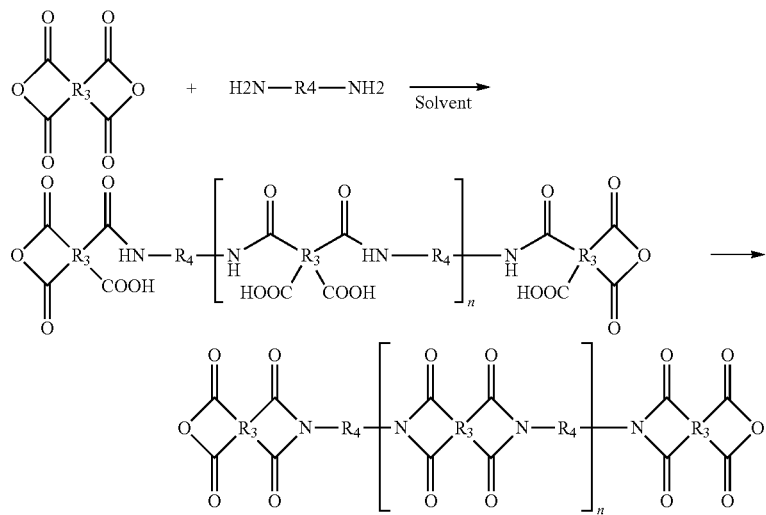

The subsequent second step of block (B) to form the block copolyimide of the present invention is shown in the following Scheme 2:

Scheme 2:

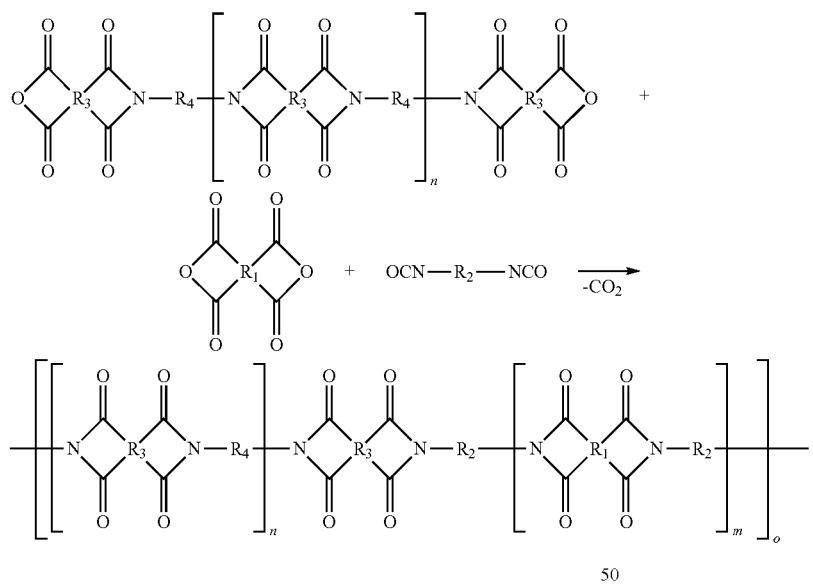

The range for the index "o" follows from the above particulars for "m", "n" and "$M_n$".

In this embodiment, the process of the present invention comprises the following steps:
a. preparing an oligo/polyimide (polymer block (B)) having terminal anhydrides from at least one dianhydride of formula (II)

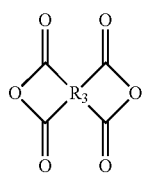
(II)

and at least one diamine of formula (III)

$H_2N-R_4-NH_2$ (III)

wherein $R_3$ and $R_4$ are each as defined above,
b. reacting the oligo/polyimide of step a) with at least one dianhydride of formula (IV)

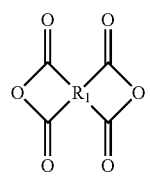
(IV)

and at least one diisocyanate (V)

where $R_1$ and $R_2$ are each as defined above, to form a block copolyimide, wherein step b) is preferably carried out using a catalyst.

Step a) of the abovementioned process preferably comprises the following subsidiary steps:
- a1) preparing a poly/oligoamide acid from at least one diamine of formula (III) and at least one dicarboxylic anhydride of formula (II) in an aprotic dipolar solvent, wherein the dicarboxylic anhydride is present in molar excess
- a2) imidating the poly/oligoamide acid,
- a3) precipitating the polyimide/oligoimide of step a2),
- a4) washing, preferably with water
- a5) drying, preferably at 30 to 200° C., more preferably at 50 to 180° C. and most preferably at 70 to 150° C. and/or conditioning, preferably at 200 to 450° C., more preferably at 200 to 400° C. and most preferably at 200 to 300° C.

Step a1) more preferably comprises first dissolving a diamine (III) or a mixture of diamines (III) in an aprotic dipolar solvent, preferably DMSO, DMF, DMAc or NMP, and by preferably portionwise addition of a dianhydride of formula (II) or a mixture of dianhydrides of formula (II) with cooling preparing a poly/oligo amide acid. The anhydrides are added in excess, this gives a polymer/oligomer having terminal anhydrides. The excess is preferably from 0.1 to 30 mol %, more preferably from 1 to 10 mol % and most preferably from 3 to 8%. The excess of anhydrides can be used to control the degree of polymerization and hence also the block length in the ensuing preparation of the block copolyimide. Block length, as mentioned, affects the microphase separation characteristics, the phase structure, the domain formation and the size of the domains.

The reaction is preferably carried out at from −10 to 80° C., most preferably at from 0 to 30° C., since at higher temperature the polyamide acid undergoes degradation due to autocatalytic hydrolysis.

A poly/oligo amide acid is formed in step a) and still has to be converted into a polyimide/oligoimide in step a2). The customary methods of imidation from the literature may be employed here, for example a thermal imidation or a chemical imidation, preferably with a base, more preferably with a tertiary nitrogen base, especially pyridine or triethylamine, and preferably a water-withdrawing agent, more preferably acetic anhydride or acetyl chloride or thionyl chloride.

Especially a polymer block (B) consisting of BTDA/PMDA and MesDA surprisingly proved to be imidatable without adding a stoichiometric amount of base. Adding a catalytic amount of a tertiary base, preferably from 0.1 to 1 mol %, of preferably DABCO (diazabicyclooctane) or DBU (diazabicycloundecane), and of a slightly superstoichiometric amount, especially 5 to 30 mol % above stoichiometric, of a water-withdrawing agent, preferably acetic anhydride or acetyl chloride or thionyl chloride, most preferably acetic anhydride, led to full imidation.

The addition of the water-withdrawing agent is preferably first followed in step a2) by continued stirring—first at −10 to 40° C., preferably at 20 to 30° C. for 0.1 to 20 h, preferably 5 to 12 h, then preferably for 0.1 to 20 h, preferably for 5 to 12 h, at elevated temperature, preferably at 40 to 120° C., more preferably at 50 to 90° C., to complete the reaction.

The solution of the polyimide/oligoimide is precipitated in step a3). This is preferably effected by addition into or of water or some other nonsolvent or nonsolvent mixture, preferably water or a mixture of nonsolvent and water.

The powder thus obtained is preferably washed in step a4) until the solvent content is not more than 1 weight %, preferably in the range from 0.05 to 0.5 weight %.

Drying and/or conditioning under the abovementioned conditions is then preferably carried out in step a5) in order to bring about a final imidation. The steps of drying and conditioning may also be carried out in one operation.

Block (B) thus obtained is dissolved in step b) of this embodiment of the process according to the present invention, preferably in an aprotic dipolar solvent, more preferably sulfolane, dimethylformamide, dimethylacetamide, N-methylpyrrolidinone, N-ethylpyrrolidinone, dimethylpropionamide, tetramethylurea or mixtures thereof, and reacted with a corresponding amount of an aromatic dianhydride or a mixture of various dianhydrides selected from the group consisting of BTDA and PMDA, with at least one diisocyanate, preferably selected from the group consisting of 2,4-TDI (2,4-tolylene diisocyanate), 2,6-TDI (2,6-tolylene diisocyanate) and 4,4'-MDI (4,4'-methylene diphenyl diisocyanate).

It is particularly preferable for step b) to comprise the following subsidiary steps b1) and b2):
- b1) preparing a solution of the oligoimide of step a. in an aprotic dipolar solvent together with PMDA and/or with BTDA and with a basic catalyst,
- b2) adding at least one diisocyanate or a mixture of two or more diisocyanates selected from the group consisting of 2,4-TDI 2,6-TDI and 4,4'-MDI in a preferably continuous manner to form a block copolymer.

A soluble block copolyimide is obtained by, preferably continuous, addition of an aromatic diisocyanate or a mixture of aromatic diisocyanates selected from the group consisting of 2,4-TDI (2,4-tolylene diisocyanate), 2,6-TDI (2,6-tolylene diisocyanate) and 4,4'-MDI (4,4'-methylene diphenyl diisocyanate) in step b2).

The diisocyanates together with BTDA and/or PMDA form the highly selective fraction of the block copolymer. The catalyst used for the reaction in step b) is preferably an organic amine, more preferably a tertiary organic amine, most preferably DABCO or DBU or a basic salt, preferably KOH, NaOH or Na methoxide.

The block copolyimide is obtained as a honey-like mass having a solids content between 15 and 40%, preferably between 20 and 30% and most preferably between 25 and 28%.

The polymer solution as obtained directly after the polymerization, i.e. after step b), can be processed directly—without precipitating the polymer—into hollow fiber or flat sheet membranes. More commonly employed technologies for preparation of hollow fiber membranes or flat sheet membranes are used here. Reference may be made here to WO 2011/009919 A1 "Polyimide membranes from polymerization solutions", where the production of flat sheet membrane and hollow fiber membranes is described. The block copolyimides of the present invention can also be used to prepare a membrane by the process described.

In a second preferred embodiment of the process according to the present invention, the polymer block (A) is initially prepared with a certain block length and an appropriate reactive end group. This block is then used together with the other monomers and/or end-functionalized oligo- or polymers of block (B) to first prepare a polyimide/polyamide acid copolymer and finally therefrom a soluble block copolyimide. An overview of the first part of this process, i.e. the preparation of block (A), is shown in the following Scheme 3:

Scheme 3:

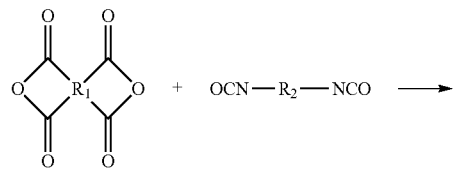

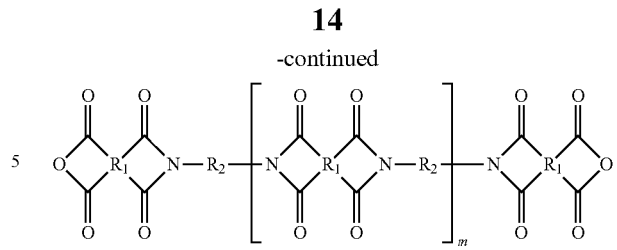

Scheme 4 finally shows the production of the block copolyimide according to the present invention from block (A), as obtained according to Scheme 3, via reaction with at least one dianhydride (II) and at least one diamine (III):

Scheme 4:

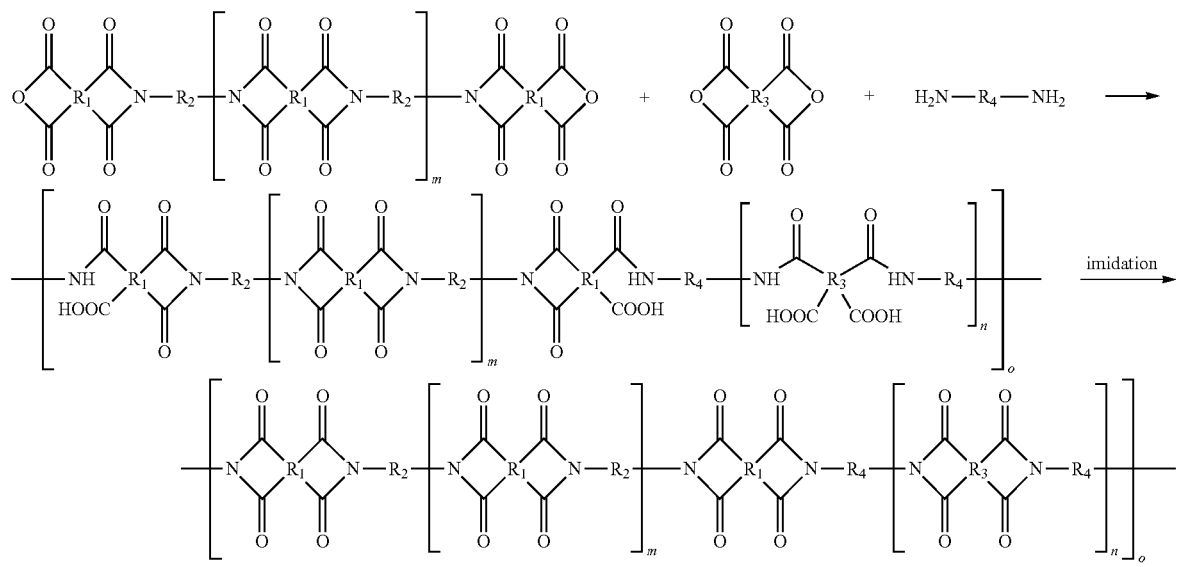

The range for the index "o" follows from the above particulars for "m", "n" and "$M_n$".

Scheme 5 shows the preparation of the block copolyimide according to the present invention from block (A), as obtained according to Scheme 3, by reaction with a previously prepared oligo- or polymer of block (B):

Scheme 5:

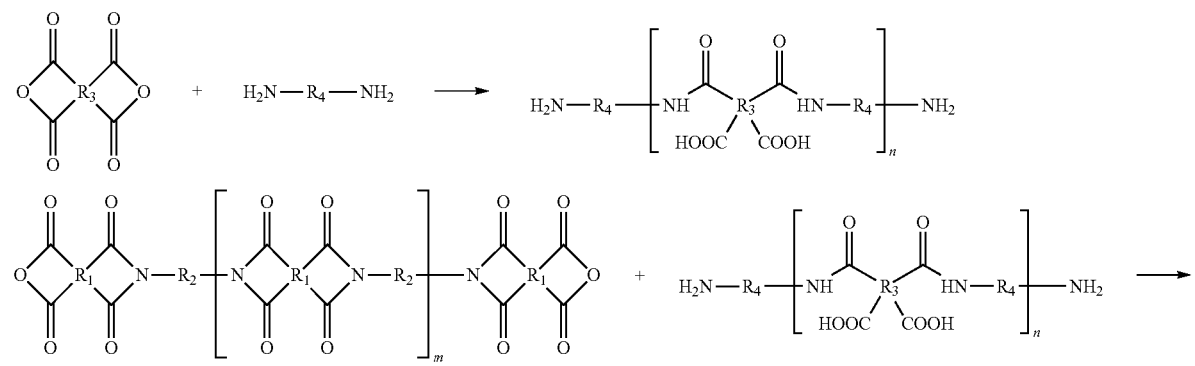

-continued

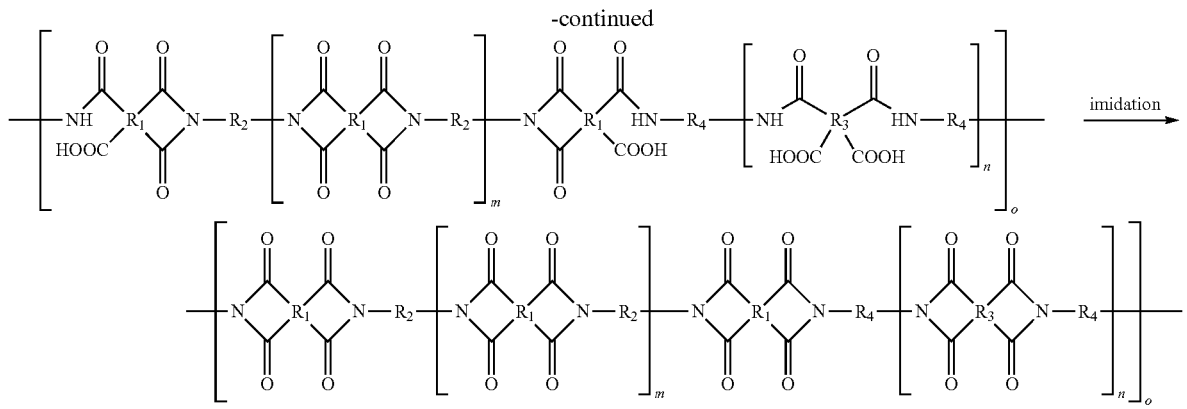
imidation →

The range for the index "o" follows from the above particulars for "m", "n" and "$M_n$".

In this second preferred embodiment, therefore, the process of the present invention comprises the following steps:
(i) an oligo- or polyimide block (A) having terminal anhydrides is prepared from at least one dianhydride of formula (IV)

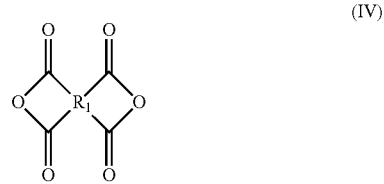
(IV)

and at least one diisocyanate of formula (V)

CN—$R_2$—NCO (V)

wherein $R_1$ and $R_2$ are each as defined above,
(ii) a polyimide/polyamide acid block copolymer is prepared by reacting block (A) as obtained from step (i) with at least one dianhydride of formula (II)

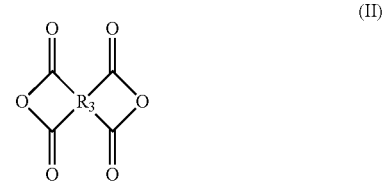
(II)

where $R_3$ is defined as described above,
and at least one diamine of formula (III)

$H_2N$—$R_4$—$NH_2$ (III), wherein $R_4$ is as defined above
and/or with at least one block (B) having terminal amino groups and prepared from at least one dianhydride of formula (II) and at least one diamine of formula (III),
(iii) the polyimide/polyamide acid block copolymer formed in step iii) is imidated, preferably chemically, more preferably with pyridine and acetic anhydride,
Steps (i) and (ii) are preferably carried out in an aprotic dipolar solvent or mixtures of aprotic dipolar solvents.

Step i) of this embodiment of the process according to the present invention is preferably carried out in an aprotic dipolar solvent, more preferably in sulfolane, dimethylformamide, dimethylacetamide, N-methylpyrrolidinone, N-ethylpyrrolidinone, dimethylpropionamide, tetramethylurea or mixtures thereof. A corresponding amount of an aromatic dianhydride or a mixture of various dianhydrides selected from the group consisting of BTDA and PMDA, is reacted with at least one diisocyanate, preferably selected from the group consisting of 2,4-TDI (2,4-tolylene diisocyanate), 2,6-TDI (2,6-tolylene diisocyanate) and 4,4'-MDI (4,4'-methylene diphenyl diisocyanate).

A soluble oligo- or polyimide block (A) is obtained in step i) by, preferably continuous, addition of one of the aforementioned aromatic diisocyanates or of a mixture thereof. The catalyst used for the reaction in step i) is preferably an organic amine, more preferably a tertiary organic amine, most preferably DABCO or DBU or a basic salt, preferably KOH, NaOH or Na methoxide.

The reaction is preferably carried out at a temperature of 60 to 120° C., preferably 70 to 100° C., for from 1 to 20 h, preferably 4 to 12 h.

Step iia) preferably comprises first dissolving a diamine (III) or a mixture of diamines (III) in an aprotic dipolar solvent, preferably DMSO, DMF, DMAc or NMP, and by preferably portionwise addition of a dianhydride of formula (II) or a mixture of dianhydrides of formula (II) with cooling preparing a poly/oligo amide acid. The diamines are added in excess, this gives a polymer/oligomer having terminal anhydrides. The excess is preferably from 0.1 to 30 mol %, more preferably from 1 to 10 mol % and most preferably from 3 to 8%. The excess of diamines can be used to control the degree of polymerization and hence also the block length in the ensuing preparation of the block copolyimide. Block length, as mentioned, affects the microphase separation characteristics, the phase structure, the domain formation and the size of the domains.

Maintaining certain temperature limits in steps iia) and iib) helps to minimize secondary reactions such as the autocatalytic hydrolysis of polyamide acid at comparatively high temperatures. The reaction is preferably carried out at a temperature of −10 to 80° C., preferably at 0 to 50° C. and more preferably at 10 to 30° C. for from 1 to 20 h, preferably from 4 to 12 h.

The complete reaction of diamines (III) with dianhydrides (II) is followed in step iib) by the reaction with block (A) as prepared in step i). The reaction is preferably carried out at a temperature of −10 to 80° C., preferably at 10 to 50° C. and more preferably at 10 to 30° C. for from 1 to 20 h, preferably from 4 to 12 h.

Alternatively, but likewise preferably, step ii) comprises not preparing the poly- or oligoimide block (B), but reacting block (A) as obtained in step i) directly with at least one diamine (III) and at least one dianhydride (II) to form the polyimide/polyamide acid block copolymer.

The reaction is preferably carried out at a temperature of −10 to 80° C., preferably 10 to 30° C., for from 1 to 20 h, preferably 4 to 12 h.

A polyimide/polyamide acid block copolymer is formed in step ii) and still has to be converted into a polyimide in step iii). The customary methods of imidation from the literature may be employed here, for example a thermal imidation or a chemical imidation. The statements made above in respect of the first preferred embodiment apply mutatis mutandis.

The block copolyimide solution obtained after step iii) can be used to prepare a membrane directly.

The processes of the present invention make possible the initial preparation, in the first stages a) or i), of two or more different blocks (B) or two or more different blocks (A) and their subsequent further conversion, as a mixture, in the subsequent steps, into block copolymers which are in accordance with the present invention in that block copolymers are obtained at the end which contain two or more different (A) and/or different blocks (B). The different (A) and (B) blocks may differ in their monomer composition or the ratio thereof, for example.

The block copolymers of the present invention are very useful in the preparation of membranes, particularly in the preparation of integrally asymmetrical membranes. Very particular preference is given to preparing asymmetrically integral hollow fiber membrane or asymmetrically integral flat sheet membrane therefrom.

As already noted, the membranes are more preferably prepared directly from the polymer solution obtained during the preparation of the block copolyimide according to one of the abovementioned processes, i.e. without intervening isolation of the block copolyimide, for example as a powder.

The membranes of the present invention are in turn used to prepare modules, preferably hollow fiber membrane modules or spiral wound elements.

The membranes and/or membrane modules of the present invention are preferably used for resolution of gas mixtures, in particular for mixtures of $CO_2$ and $CH_4$, hydrogen and carbon monoxide, helium and nitrogen, helium and methane, hydrogen and methane, oxygen and nitrogen, or for dehumidification of gas streams.

To resolve gas mixtures, the membranes and/or modules are preferably used in corresponding gas separation devices which likewise form part of the subject-matter of the present invention.

Methods of Measurement:

Determination of Molecular Weight $M_w$, $M_p$ and $M_n$

Molar mass is determined by gel permeation chromatography. Calibration is against polystyrene standards. The molar masses reported are thereto formed to be understood as relative molar masses.

Components and settings used were as follows:

| | |
|---|---|
| HPLC | WATERS 600 pump, 717 autoinjector, 2487 UV detector |
| Precolumn | PSS SDV precolumn |
| Columns | PSS SDV 10 μm 1000, $10^5$ and $10^6$ Å |
| Mobile phase | 0.01M LiBr + 0.03M $H_3PO_4$ in DMF (sterile-filtered, 0.45 μm) |
| Flow | 1.0 ml/min |
| Run time | 45 min |
| Pressure | ~1550 psi |
| Wavelength | 270 nm (with use of UV detector) |
| Injection volume | 50 μl or 20 μl (for solutions c > 1 g/l) |
| Standards | PS(polystyrene) standards (narrow distribution, 300-3 · $10^6$, PSS) |

Determination of Permeability

Gas permeabilities are recorded for foils in barrer ($10^{-10}$ $cm^3 \cdot cm^{-2} \cdot cm \cdot s^{-1} \cdot cmHg^{-1}$). Permeances of hollow fibers or flat sheet membranes for gases are reported in GPUs (Gas Permeation Units, $10^{-6}$ $cm^3 \cdot cm^{-2} \cdot s^{-1} \cdot cmHg^{-1}$).

Permeabilities for gases are measured by the pressure rise method. A flat foil between 10 and 70 μin thickness has a gas or gas mixture applied to it from one side. On the other side, the permeate side, there is a vacuum (ca. $10^{-2}$ mbar) at the start of the test. Then, pressure rise on the permeate side over time is recorded. The polymer's permeability can be computed by the following formula:

$$P = \frac{V_{dead} \cdot MW_{gas} \cdot l}{\rho \cdot R \cdot T \cdot A \cdot \Delta p} \cdot \frac{dp}{dt} \cdot 10^{10}$$

P . . . permeability in barrer ($10^{-10}$ $cm^3$ (STP) $cm^{-2} \cdot cm \cdot s^{-1} \cdot cmHg^{-1}$)

$V_{dead}$ . . . volume of permeate side in $cm^3$ $MW_{gas}$ . . . molar mass of gas in $g \cdot mol^{-1}$ l . . . layer thickness of foil in cm ρ . . . density of gas in $g \cdot cm^{-3}$ R . . . gas constant in $cm^3 \cdot cmHg \cdot K^{-1} \cdot mol^{-1}$ T . . . temperature in kelvins A . . . area of foil in $cm^2$ Δp . . . pressure difference between feed and permeate side in cmHg dp/dt . . . pressure rise per time on permeate side in $cmHg \cdot s^{-1}$ To measure the permeance of hollow fibers, the flow (at standard temperature and pressure; STP) of the permeate side is measured at constant pressure (atmospheric). Permeance is computed using the following formula:

$$p = \frac{Q}{A \cdot \Delta p} \cdot 10^6$$

p . . . permeance in GPU (gas permeation units. $10^{-6}$ $cm^3(STP) cm^{-2} \cdot s^{-1} \cdot cmHg^{-1}$)

Q . . . flow of permeate side in $cm^3$ (STP)/s

A . . . outside surface area of hollow fiber in $cm^2$

Δp . . . pressure difference between feed and permeate side in cmHg.

The selectivities of various gas pairs are pure-gas selectivities. The selectivity between two gases computes from the ratio of permeabilities:

$$S = \frac{P_1}{P_2}$$

S . . . ideal gas selectivity $P_1$ . . . in the case of foils and flat sheet membranes is the permeability or in the case of hollow fiber membranes the permeance of gas 1

$P_2$ . . . in the case of foils and flat sheet membranes is the permeability or in the case of hollow fiber membranes the permeance of gas 2

Determination of Dynamic Viscosity:

Dynamic viscosity η is ascertained by shearing the polymer solution in a cylindrical gap at a constant 25° C. once by mandating various rotation rates Ω (or shear gradients γ) and then by mandating various shear stresses τ.

The measuring instrument used is a HAAKE RS 600 with a liquid-heatable measuring cup receiver TEF/Z28, a cylindrical rotor Z25DIN53019/ISO3219 and a disposable aluminum measuring cup Z25E/D=28 mm The shear stress is measured at a particular shear gradient. Dynamic viscosity computes from the following formulae and is reported for a shear gradient of 10 s$^{-1}$ in Pa·s.

$$\text{Viscosity function } \frac{\tau}{\gamma} = \eta * \gamma^2$$

$$\text{Shear gradient } \gamma = M * \Omega$$

τ . . . shear stress
η . . . dynamic viscosity
M . . . shear factor of rotor: 12350 rad/s
Ω . . . angular velocity Determination of Polydispersity (PDI)

The polydispersity PDI of the polymer is the quotient formed by dividing the number average $M_n$ into the mass average $M_w$, which are obtained from the molar mass determination. The molar masses are relative molar masses based on polystyrene standards.

Determination of Degree m or n of Polymerization

The degree of polymerization is a purely arithmetic quantity and is obtained from the molar ratio of the monomers used.

The examples which follow serve to provide more particular elucidation and better understanding of the present invention, but do not limit it in any way.

EXAMPLE 1: PREPARING A POLYMERIC/OLIGOMERIC BLOCK (B)

a) Preparing the Poly/Oligo Amide Acid (Degree of Polymerization m=20)

In a 250 ml flask equipped with reflux condenser, mechanical stirrer and nitrogen flushing, 17.10 g (0.114 mol) of 2,4,6-trimethylbenzene-1,3-diamine (MesDA) are dissolved in 161 g of DMF. The yellow solution is cooled down to 10° C. and a mixture of 19.32 g (0.06 mol) of 3,3'4,4'-benzophenonetetracarboxylic dianhydride (BTDA) and 13.08 g (0.06 mol) of pyromellitic dianhydride (PMDA) is added step by step to the solution. The solution is subsequently warmed to room temperature and stirred for 8 h.

b) Imidating the Oligomeric Polyamide Acid (Degree of Polymerization m=20)

The solution prepared in Example 1, step a) of an oligomeric polyamide acid has added to it, dropwise, a mixture of 27.91 g (0.274 mol) of acetic anhydride with 28 g of DMF in gradual fashion using a dropping funnel. This is followed by the addition of 0.05 g of 1,4-diazabicyclo[2.2.2]octane (DABCO). The solution is subsequently stirred at room temperature for 8 h and at 70° C. for a further 8 h.

After the reaction has ended, the oligoimide is precipitated in water. The precipitate is washed with copious water and then dried in a vacuum drying cabinet at 70° C. The dry oligoimide is then conditioned at 230-260° C. for 2 h.

The gel permeation chromatography of the oligoimide reveals a molecular mass $M_n$ of 35 501 g/mol, $M_w$ of 54 348 g/mol, $M_p$ of 55 413 g/mol and a polydispersity of 1.52.

EXAMPLES 2 AND 3: PREPARING FURTHER BLOCKS (B) (DEGREES OF POLYMERIZATION M=10 AND/OR M=33)

Varying the amount of 2,4,6-trimethylbenzene-1,3-diamine (MesDA) makes possible the preparation of oligoimides having different degrees of polymerization. The oligoimides are prepared according to the same procedure as that described in Example 1. The composition of the reaction mixture and of the amounts of BTDA, PMDA, MesDA, DABCO and acetic anhydride which are used therefor are summarized in Table 1.

TABLE 1

| Ex. | Degree of polymerization BPM | BTDA [g/mol] | PMDA [g/mol] | MesDA [g/mol] | DMF [g] | Acetic anhydride [g/mol] | DABCO [g] |
|---|---|---|---|---|---|---|---|
| 2 | 10 | 19.32 (0.06) | 13.08 (0.06) | 16.20 (0.108) | 158.5 | 26.44 (0.259) | 0.04 |
| 3 | 33 | 19.32 (0.06) | 13.08 (0.06) | 17.46 (0.116) | 161.9 | 28.49 (0.279) | 0.05 |

The molecular weights of the oligoimides obtained are summarized in Table 2.

TABLE 2

| Ex. | $M_n$ [g/mol] | $M_w$ [g/mol] | $M_p$ [g/mol] | Polydispersity |
|---|---|---|---|---|
| 2 | 28314 | 47802 | 49561 | 1.69 |
| 3 | 50174 | 100135 | 100452 | 2.00 |

EXAMPLES 4-8: PREPARING AN OLIGOMER BLOCK BY VARYING THE EMPLOYED DIANHYDRIDES/DIAMINES (B)

Varying the monomers used—not only mixtures or alternative dianhydrides but also mixtures of alternative diamines (mesitylenediamine [MesDA], 2,3,5,6-tetramethyl-p-phenylenediamine [DurDA], 4,4'-diamino-3,3'-diethyl-5,5'-dimethyldiphenylmethane (DDDDPM) 4,4'-diamino-3,3'-dimethyldiphenylmethane (DDDPM))—makes possible the preparation of novel oligoimides that are in accordance with the present invention and have novel properties. The oligoimides are prepared according to the same procedure as that described in Example 1. The composition of the reaction mixture and of the amounts of dianhydrides, diamines, DABCO and acetic anhydride which are used therefor are summarized in Table 3.

TABLE 3

| Ex. | BTDA [g (mol)] | PMDA [g (mol)] | ODPA [g (mol)] | 6-FDA [g (mol)] | MesDA [g (mol)] | DurDA [g (mol)] | DDDDPM [g (mol)] | DDDPM [g (mol)] | DMF [g] | Acetic anhydride [g (mol)] | DABCO [g] |
|---|---|---|---|---|---|---|---|---|---|---|---|
| 4 | 27.05 (0.084) | — | — | 15.99 (0.036) | 17.10 (0.114) | — | — | | 198.7 | 27.91 (0.274) | 0.06 |
| 5 | 11.59 (0.036) | — | 26.06 (0.084) | — | 17.10 (0.114) | — | — | | 179.56 | 27.91 (0.274) | 0.06 |
| 6 | 6.44 (0.020) | 4.36 (0.020) | | | | | 10.37 (0.038) | | 71.50 | 9.30 (0.091) | 0.02 |
| 7 | 6.44 (0.020) | 4.36 (0.020) | | | | | | 8.60 (0.038) | 63.94 | 9.30 (0.091) | 0.02 |
| 8 | 13.52 (0.042) | 9.16 (0.042) | — | — | 7.98 (0.053) | 2.18 (0.013) | 3.76 (0.013) | | 119.60 | 19.54 (0.192) | 0.03 |

The molecular weights of the oligoimides obtained are summarized in Table 4.

TABLE 4

| Ex. | $M_n$ [g/mol] | $M_w$ [g/mol] | $M_p$ [g/mol] | Polydispersity |
|---|---|---|---|---|
| 4 | 40164 | 73929 | 75908 | 1.84 |
| 5 | 38810 | 78853 | 78771 | 2.03 |
| 6 | 47041 | 95282 | 84396 | 2.03 |
| 7 | 74037 | 162969 | 126439 | 2.20 |
| 8 | 44329 | 79616 | 80057 | 1.80 |

EXAMPLE 9: PREPARING A BLOCK COPOLYIMIDE IN THE COMPOSITION OF BLOCKS A:B=45:55

In a 250 ml flask equipped with reflux condenser, mechanical stirrer, nitrogen flushing and isocyanate metering, 19.32 g (0.06 mol) of 3,3',4,4'-benzophenonetetracarboxylic dianhydride (BTDA) and 8.72 g (0.04 mol) of pyromellitic dianhydride (PMDA) are presented as initial charge and 212.3 g of DMF are added. The reaction mixture is subsequently heated to 80° C. 45.40 g of the oligoimide (block (B)) from Example 2 are added to the solution. This is followed by the addition of 0.08 g of DABCO to the solution. The reddish brown solution subsequently has added to it 18.44 g (0.106 mol) of an isocyanate mixture consisting of 80% 2,4-tolylene diisocyanate and 20% 2,6-tolylene diisocyanate over 8 h with the evolution of $CO_2$. The viscous solution is subsequently stirred at 80° C. until the reaction has ended.

The viscous solution has a dynamic viscosity of 88 Pa·s. The gel permeation chromatography of the block copolyimide solution shows a molecular weight $M_n$ of 77 006 g/mol, $M_w$ of 174 183 g/mol, $M_p$ of 127 156 g/mol and a polydispersity of 2.26.

EXAMPLES 10-15: PREPARATION OF FURTHER BLOCK COPOLYIMIDES OF DIFFERING COMPOSITION

Different block copolyimides can be prepared on the basis of the procedure described in Example 9 by varying the ratios between blocks (A) and (B). The composition of each reaction batch is summarized in Table 5.

TABLE 5

| Ex. | Ratio A/B | BTDA [g (mol)] | PMDA [g (mol)] | DMF [g] | Block (B) [g] | 80% 2,4-TDI + 20% 2,6-TDI [g/mol] | DABCO [g] |
|---|---|---|---|---|---|---|---|
| 10 | 70:30 | 55.55 (0.173) | 25.07 (0.115) | 338.3 | 45.40 | 51.07 (0.294) | 0.15 |
| 11 | 65:35 | 44.11 (0.137) | 19.91 (0.091) | 333.2 | 45.40 | 40.77 (0.234) | 0.13 |
| 12 | 55:45 | 28.98 (0.090) | 13.08 (0.060) | 259.4 | 45.40 | 27.14 (0.156) | 0.10 |
| 13 | 50:50 | 23.67 (0.074) | 10.68 (0.049) | 233.5 | 45.40 | 22.36 (0.129) | 0.09 |
| 14 | 40:60 | 15.68 (0.049) | 7.08 (0.032) | 194.5 | 45.40 | 15.17 (0.087) | 0.08 |
| 15 | 25:75 | 7.70 (0.024) | 3.47 (0.016) | 155.6 | 45.40 | 7.98 (0.046) | 0.06 |

The block copolyimide solutions obtained were subsequently measured with regard to molecular weight and dynamic viscosity; the viscosities and molar masses characteristic for the block copolyimides are summarized in Table 6.

TABLE 6

| Ex. | $M_n$ [g/mol] | $M_w$ [g/mol] | $M_p$ [g/mol] | Polydispersity | Dynamic viscosity [Pa · s] |
|---|---|---|---|---|---|
| 10 | 75528 | 144515 | 131806 | 1.91 | 44 |
| 11 | 53454 | 127745 | 116475 | 2.39 | 62 |
| 12 | 56070 | 108207 | 103460 | 1.93 | 22 |
| 13 | 61648 | 114833 | 107564 | 1.86 | 18 |
| 14 | 63694 | 125253 | 115509 | 1.97 | 21 |
| 15 | 47371 | 142575 | 117321 | 3.01 | 46 |

EXAMPLES 16 AND 17: PREPARATION OF BLOCK COPOLYIMIDES HAVING DIFFERENT BLOCK LENGTHS FOR BLOCK (B)

The operating instructions of Examples 9 to 15 can be used as a basis for preparing further block copolyimides, the properties of which can be adapted by varying the (B) block length. The oligoimides prepared in Examples 2 and 3 are used for this. The composition of the reaction mixtures is summarized in Table 7.

TABLE 7

| Ex. | Degree of polymerization m BPM | BTDA [g/mol] | PMDA [g/mol] | DMF [g] | Block (B) [g] | 80% 2,4-TDI + 20% 2,6-TDI [g (mol)] | DABCO [g] |
|---|---|---|---|---|---|---|---|
| 16 | 10 | 20.35 (0.063) | 9.19 (0.042) | 226.7 | 48.51 | 20.48 (0.118) | 0.09 |
| 17 | 33 | 21.09 (0.066) | 9.52 (0.044) | 230.9 | 49.43 | 19.74 (0.234) | 0.09 |

The polymer solution was subsequently measured with regard to its molar mass and dynamic viscosity; the characteristic data are summarized in Table 8.

TABLE 8

| Ex. | $M_n$ [g/mol] | $M_w$ [g/mol] | $M_p$ [g/mol] | Polydispersity | Dynamic Viscosity [Pa·s] |
|---|---|---|---|---|---|
| 16 | 55269 | 107337 | 105828 | 1.94 | 24 |
| 17 | 52169 | 122785 | 123479 | 2.35 | 23 |

EXAMPLE 18: PREPARING A BLOCK COPOLYIMIDE HAVING ALTERNATIVE (A) BLOCK AND THE COMPOSITION A:B=55:45

In a 250 ml flask equipped with reflux condenser, mechanical stirrer, nitrogen flushing and isocyanate metering, 24.3 g (0.075 mol) of 3,3',4,4'-benzophenonetetracarboxylic dianhydride (BTDA) are introduced as initial charge and 170.0 g of DMF are added. The reaction mixture is subsequently heated to 85° C. 25.2 g of the oligoimide from Example 1 are added to the solution. This is followed by the addition to the solution of 1 g of DABCO and 1.47 g of toluenediamine. The reddish brown solution subsequently has added to it 13.53 g (0.077 mol) of 2,4-tolylene diisocyanate over 8 h with the evolution of $CO_2$. The viscous solution is subsequently stirred at 85° C. until the reaction has ended.

The viscous solution has a dynamic viscosity of 17 Pa·s. The gel permeation chromatography of the block copolyimide solution shows a molecular weight $M_n$ of 59 268 g/mol, $M_w$ of 138 236 g/mol, $M_p$ of 124 001 g/mol with a PDI of 2.33.

EXAMPLE 19: PREPARING A BLOCK COPOLYIMIDE HAVING ALTERNATIVE (A) BLOCK AND THE COMPOSITION A:B=52:48

In a 250 ml flask equipped with reflux condenser, mechanical stirrer, nitrogen flushing and isocyanate metering, 24.15 g (0.075 mol) of 3,3',4,4'-benzophenonetetracarboxylic dianhydride (BTDA) are introduced as initial charge and 187.7 g of DMAc are added. The reaction mixture is subsequently heated to 85° C. 29.80 g of the oligoimide from Example 1 are added to the solution. This is followed by the addition of 0.20 g of DABCO. The reddish brown solution subsequently has added to it 14.95 g (0.079 mol) of an isocyanate mixture consisting of 80% tolylene diisocyanate (80% 2,4-tolylene diisocyanate and 20% 2,6-tolylene diisocyanate) and 20% 4,4'-methylenebis(phenyl isocyanate) (MDI), over 4.7 h with the evolution of $CO_2$. The viscous solution is subsequently stirred at 85° C. until the reaction has ended.

EXAMPLES 20-24: PREPARING A BLOCK COPOLYIMIDE HAVING ALTERNATIVE (B) BLOCK AND THE COMPOSITION A:B=45:55

The operating instructions of Examples 9 to 15 can be used as a basis for preparing further block copolyimides, the properties of which can be adapted by varying the (B) block composition. The oligoimides prepared in Examples 4 to 8 are used for this. The composition of the reaction mixtures is summarized in Table 9.

TABLE 9

| Ex. | (B) Block from Ex. | BTDA [g (mol)] | PMDA [g (mol)] | DMF [g] | Block (B) [g] | 80% 2,4-TDI + 20% 2,6-TDI [g (mol)] | DABCO [g] |
|---|---|---|---|---|---|---|---|
| 20 | 4 | 10.67 (0.033) | 4.82 (0.022) | 116.9 | 25.0 | 10.08 (0.058) | 0.05 |
| 21 | 5 | 12.78 (0.040) | 9.52 (0.026) | 140.3 | 30.0 | 12.13 (0.070) | 0.09 |
| 22 | 6 | 6.39 (0.020) | 2.89 (0.013) | 70.1 | 15.0 | 6.02 (0.035) | 0.03 |
| 23 | 7 | 6.40 (0.020) | 2.89 (0.013) | 70.2 | 15.0 | 6.05 (0.035) | 0.03 |
| 24 | 8 | 8.51 (0.026) | 3.84 (0.018) | 93.5 | 20.0 | 8.10 (0.035) | 0.04 |

The polymer solution was subsequently measured with regard to its molar mass; the characteristic data are summarized in Table 10.

TABLE 10

| Ex. | $M_n$ [g/mol] | $M_w$ [g/mol] | $M_p$ [g/mol] | Polydispersity |
|---|---|---|---|---|
| 20 | 51417 | 117337 | 106851 | 2.28 |
| 21 | 51276 | 110628 | 86517 | 2.16 |
| 22 | 38403 | 108133 | 45567 | 2.82 |
| 23 | 35614 | 120157 | 28816 | 3.37 |
| 24 | 57221 | 129584 | 119094 | 2.26 |

EXAMPLES 25-29: PREPARATION AS PER SECOND PREFERRED EMBODIMENT OF PROCESS ACCORDING TO THE PRESENT INVENTION WITH AN (A) BLOCK HAVING A DEGREE OF POLYMERIZATION N=19 i) Preparation of (A) Block (Block Length n=10) in Solution:

In a 2 L flask equipped with reflux condenser, mechanical stirrer, nitrogen flushing and isocyanate metering, 325.05 g (1.009 mol) of 3,3',4,4'-benzophenonetetracarboxylic dianhydride (BTDA) are introduced as initial charge and 1229.4 g of DMF are added. The reaction mixture is subsequently heated to 90° C. This is followed by the addition of 1.15 g of DABCO and 0.56 g of 2,4-toluenediamine. The reddish brown solution subsequently has added to it 157.18 g (0.908 mol) of 2,4-tolylene diisocyanate over 200 min with the evolution of $CO_2$. The viscous solution is subsequently stirred at 90° C. until the reaction has ended. The solution is then emptied into a 2 L measuring flask and diluted to 2 L with DMF.

ii) Preparing the Block Copolyimide

In a flask, an initial charge of MesDA is dissolved with a defined amount of DMF. The solution is cooled to around 15° C. A mixture of PMDA and BTDA is then added in small portions.

Following full reaction of the dianhydride with MesDA, a defined volume of the block (A) oligomer solution is added dropwise to the solution. Small amounts of BTDA are metered in subsequently to achieve high viscosities. The solution is stirred at 15° C. for a further 5 h to complete the reaction.

iii) Imidation

This is followed by the rapid dropwise addition of a mixture of acetic anhydride and pyridine and subsequent stirring at room temperature for an hour. The solution is stirred at 60° C. for a further 12 h to obtain an orange solution.

Block copolyimides having different ratios between the (A) and (B) blocks are preparable by varying the initial weights. The initial weights used are summarized in Table 11.

TABLE 11

| Ex. | Ratio A/B | MesDA [g/mol] | BTDA [g/mol] | PMDA [g/mol] | DMF [g] | Block (A) oligomer solution [ml] | Pyridine [g] | Acetic acid anhydride [g] |
|---|---|---|---|---|---|---|---|---|
| 25 | 40:60 | 5.85 (0.039) | 5.88 (0.018) | 3.98 (0.018) | 35 | 50 | 12.95 | 8.36 |
| 26 | 45:55 | 5.81 (0.039) | 5.74 (0.018) | 3.89 (0.018) | 35 | 60 | 12.84 | 8.29 |
| 27 | 50:50 | 4.83 (0.032) | 4.70 (0.015) | 3.18 (0.015) | 30 | 69 | 10.68 | 6.89 |
| 28 | 55:45 | 4.71 (0.031) | 4.48 (0.014) | 3.03 (0.014) | 30 | 70 | 10.41 | 6.72 |
| 29 | 60:40 | 3.93 (0.026) | 3.65 (0.011) | 2.47 (0.011) | 30 | 70 | 8.69 | 5.61 |

The polymer solutions were subsequently measured for their molar masses by gel permeation chromatography. Characteristic molar masses are summarized in Table 12.

TABLE 12

| Ex. | A:B where in the case of A (n = 10) | $M_n$ [g/mol] | $M_w$ [g/mol] | $M_p$ [g/mol] | Polydispersity |
|---|---|---|---|---|---|
| 25 | 40:60 | 89644 | 186153 | 175438 | 2.08 |
| 26 | 45:55 | 89731 | 181403 | 172219 | 2.02 |
| 27 | 50:50 | 74543 | 143948 | 142731 | 1.93 |
| 28 | 55:45 | 85964 | 176288 | 165535 | 2.05 |
| 29 | 60:40 | 79550 | 155592 | 150242 | 1.96 |

EXAMPLES 30-40: PREPARING A BLOCK COPOLYIMIDE HAVING DEFINED (A) BLOCKS (N=39 AND N=66)

Proceeding on the basis of the operating procedure described in Examples 25-29, varying the amounts of 2,4-tolylene diisocyanate makes it possible to prepare oligoimides (block (A)) having differing block length (n=20 or n=33) and thus, after reaction with MesDA, PMDA and BTDA, further, novel block copolyimides. The composition of the reaction mixtures for preparing the oligoimides solution and the block copolyimide solution are summarized in Tables 13+14.

Preparation of (A) block oligoimide solutions having different block lengths:

TABLE 13

|  | BTDA [g/mol] | 2.4 TDI [g/mol] | DMF [g] | DABCO [g] | 2,4-Toluenediamine [g] |
|---|---|---|---|---|---|
| Block A (n = 20) | 325.05 (1.009) | 166.93 (0.958) | 1229.43 | 1.15 | 0.56 |
| Block A (n = 33) | 325.05 (1.009) | 170.44 (0.978) | 1229.43 | 1.15 | 0.34 |

Preparation of block copolyimides having both (A) blocks and different ratios A:B.

TABLE 14

| Ex. | A:B | MesDA [g/mol] | BTDA [g/mol] | PMDA [g/mol] | DMF [g] | Block A (n = 39) Solution [ml] | Block A (n = 66) Solution [ml] | Pyridine [g] | Acetic anhydride [g] |
|---|---|---|---|---|---|---|---|---|---|
| 30 | 40:60 | 5.67 (0.038) | 5.88 (0.018) | 3.98 (0.018) | 35 | 50 |  | 12.53 | 8.09 |
| 31 | 45:55 | 5.58 (0.037) | 5.74 (0.018) | 3.89 (0.018) | 35 | 60 |  | 12.35 | 7.97 |
| 32 | 50:50 | 4.60 (0.031) | 4.70 (0.015) | 3.18 (0.015) | 30 | 69 |  | 10.18 | 6.57 |
| 33 | 55:45 | 4.44 (0.030) | 4.48 (0.014) | 3.03 (0.018) | 30 | 70 |  | 9.83 | 6.34 |
| 34 | 60:40 | 3.67 (0.024) | 3.65 (0.011) | 2.47 (0.014) | 30 | 70 |  | 8.11 | 5.24 |
| 35 | 25:75 | 7.73 (0.052) | 8.21 (0.026) | 5.55 (0.026) | 60 |  | 35 | 17.10 | 11.04 |
| 36 | 35:65 | 6.90 (0.046) | 7.27 (0.023) | 4.92 (0.023) | 60 |  | 50 | 15.25 | 9.84 |
| 37 | 45:55 | 5.49 (0.037) | 5.74 (0.018) | 3.89 (0.018) | 55 |  | 60 | 12.15 | 7.84 |
| 38 | 55:45 | 4.65 (0.031) | 4.80 (0.015) | 3.25 (0.015) | 50 |  | 75 | 10.28 | 6.63 |
| 39 | 65:35 | 3.11 (0.021) | 3.16 (0.001) | 2.14 (0.001) | 35 |  | 75 | 6.89 | 4.45 |
| 40 | 75:25 | 2.66 (0.018) | 2.61 (0.008) | 1.77 (0.008) | 30 |  | 100 | 5.88 | 3.79 |

All resulting block copolyimide solutions were measured for their molar mass. Characteristic molecular weights are summarized in Tables 15 and 16:

TABLE 15

| Ex. | A:B where A (n = 20) | $M_n$ [g/mol] | $M_w$ [g/mol] | $M_p$ [g/mol] | Polydispersity |
|---|---|---|---|---|---|
| 30 | 40:60 | 76779 | 162275 | 147753 | 2.11 |
| 31 | 45:55 | 83294 | 177832 | 159160 | 2.14 |
| 32 | 50:50 | 66720 | 125666 | 120010 | 1.88 |
| 33 | 55:45 | 72307 | 143676 | 133666 | 1.99 |
| 34 | 60:40 | 74012 | 157401 | 135920 | 2.13 |

TABLE 16

| Ex. | A:B with A (n = 33) | $M_n$ [g/mol] | $M_w$ [g/mol] | $M_p$ [g/mol] | Polydispersity |
|---|---|---|---|---|---|
| 35 | 25:75 | 83468 | 234403 | 230832 | 2.81 |
| 36 | 35:65 | 81717 | 198041 | 181587 | 2.42 |
| 37 | 45:55 | 111354 | 178408 | 157482 | 1.60 |
| 38 | 55:45 | 66322 | 140685 | 131396 | 2.12 |
| 39 | 65:35 | 110925 | 205280 | 155428 | 1.85 |
| 40 | 75:25 | 50646 | 93336 | 93699 | 1.84 |

EXAMPLE 41: PREPARATION OF FOILS FROM THE BLOCK COPOLYIMIDE SOLUTIONS PRODUCED IN EXAMPLES 9-39

The block copolyimide solutions from Examples 9-39 are filtered through a filtration cell having a 15 μm filter and are then devolatilized in a desiccator. The foils are prepared using an Elcometer 4340 applicator with temperature-regulatable table. This table is temperature regulated to 30° C. The block copolymer solution is filled into the blade coater and applied to the temperature-regulated glass plate at a constant speed of drawdown. The blade gap is 400 μm during the process. The glass plate is subsequently dried at 70° C. in a circulating air drying cabinet for one hour, then at 150° C. for a further hour and at 250° C. for a further 12 h. After cooling at room temperature, the foils are detached from the glass plate in a waterbath and dried. The foils have a thickness of 30-50 μm and good mechanical properties.

The dry foils are inspected to select flawless areas and circularly round samples 46 mm in diameter are cut out to measure the permeabilities and selectivities. The permeabilities of a very wide variety of gases are determined by the vacuum method. In this method, the foils are subjected to a single gas (e.g. nitrogen, oxygen, methane or carbon dioxide) at various pressures and the increase in the pressure on the permeate side is recorded. This is used to compute the permeability in barrers.

The intrinsic permeabilities and selectivities of the individual block copolyimides are summarized in Table 17. The comparative examples used are foils obtained by the above method from the commercially available polymers P84 type 70 and P84 HT from Evonik Fibers GmbH.

TABLE 17

| Polymer | Thickness [μm] | P ($O_2$) [barrer] | P (N2) [barrer] | Sel. $O_2/N_2$ | P ($CO_2$) [barrer] | P ($CH_4$) [barrer] | Sel. $CO_2/CH_4$ |
|---|---|---|---|---|---|---|---|
| Comparative Example 1 P84 type 70 | 23.4 | 0.18 | 0.02 | 10.0 | 0.57 | 0.01 | 67.2 |
| Comparative Example 2 P84HT | 41.4 | 0.53 | 0.04 | 13.2 | 1.69 | 0.01 | 169 |
| Example 9 (A:B = 45:55) | 29.1 | 3.81 | 0.49 | 7.8 | | | |
| Example 10 (A:B = 70:30) | 33.7 | 1.57 | 0.16 | 9.8 | 4.44 | 0.06 | 74.0 |
| Example 11 (A:B = 65:35) | 49.2 | 2.38 | 0.26 | 9.0 | 7.70 | 0.12 | 66.8 |
| Example 12 (A:B = 55:45) | 46.1 | 2.68 | 0.30 | 8.9 | 9.12 | 0.15 | 61.6 |
| Example 13 (A:B = 50:50) | 37.9 | 3.24 | 0.44 | 7.3 | | | |
| Example 14 (A:B = 40:60) | 35.0 | 3.69 | 0.48 | 7.7 | | | |
| Example 15 (A:B = 25:75) | 46.4 | 5.06 | 0.76 | 6.7 | 28.15 | 0.71 | 39.9 |
| Example 16 (A:B = 45:55 with B m = 10) | 26.3 | 3.39 | 0.37 | 9.1 | | | |
| Example 17 (A:B = 45:55 with B m = 10) | 49.0 | 3.95 | 0.54 | 7.4 | | | |
| Example 18 (A:B = 55:45) | 40.8 | 1.35 | 0.17 | 7.8 | 3.69 | 0.076 | 48.8 |
| Example 19 (A:B = 52:48) | 25.4 | 1.92 | 0.26 | 7.3 | | | |
| Example 25 (A:B = 40:60 with A n = 10) | 29.1 | 3.83 | 0.61 | 6.24 | | | |
| Example 26 (A:B = 45:55 with A n = 10) | 31.1 | 3.02 | 0.46 | 6.53 | | | |

TABLE 17-continued

| Polymer | Thickness [μm] | P (O$_2$) [barrer] | P (N2) [barrer] | Sel. O$_2$/N$_2$ | P (CO$_2$) [barrer] | P (CH$_4$) [barrer] | Sel. CO$_2$/CH$_4$ |
|---|---|---|---|---|---|---|---|
| Example 27 (A:B = 50:50 with A n = 10) | 32.4 | 2.39 | 0.34 | 7.08 | | | |
| Example 28 (A:B = 55:45 with A n = 10) | 31.9 | 1.89 | 0.29 | 6.81 | | | |
| Example 29 (A:B = 60:40 with A n = 10) | 39.0 | 2.07 | 0.28 | 7.37 | | | |
| Example 30 (A:B = 40:60 with A n = 20) | 31.3 | 4.26 | 0.69 | 6.21 | | | |
| Example 31 (A:B = 45:55 with A n = 20) | 31.9 | 2.92 | 0.45 | 6.46 | | | |
| Example 32 (A:B = 50:50 with A n = 20) | 38.0 | 2.57 | 0.37 | 6.92 | | | |
| Example 33 (A:B = 55:45 with A n = 20) | 38.2 | 1.78 | 0.24 | 7.42 | | | |
| Example 35 (A:B = 25:75 with A n = 33) | 33.2 | 9.15 | 1.63 | 5.61 | 26.04 | 0.71 | 36.9 |
| Example 36 (A:B = 35:65 with A n = 33) | 38.7 | 6.62 | 1.14 | 5.82 | | | |
| Example 37 (A:B = 45:55 with A n = 33) | 44.2 | 3.61 | 0.57 | 6.36 | 8.02 | 0.20 | 40.8 |
| Example 38 (A:B = 55:45 with A n = 33) | 42.9 | 2.02 | 0.30 | 6.75 | | | |
| Example 39 (A:B = 65:35 with A n = 33) | 33.1 | 1.23 | 0.16 | 7.87 | | | |

For O$_2$, the foils formed from the inventive block copolyimides were found to have permeabilities of 1.35 to 9.15 barrers. The prior art foils were found to have permeances of 0.18 and 0.53 barrers. Therefore, the permeabilities of the polymers according to the present invention are from 2.5 to 50.8 times better than those of the prior art polymers.

For N$_2$, the foils formed from the inventive block copolyimides were found to have permeabilities of 0.16 to 1.63 barrers. The prior art foils were found to have permeances of 0.02 and 0.04 barrers. Therefore, the permeabilities of the polymers according to the present invention are from 4 to 81.5 times better than those of the prior art polymers.

As far as the selectivities are concerned, the foils formed from the inventive polymers were found to have values of 6.24 to 9.8 barrers for O$_2$/N$_2$. The prior art foils had values of 10 and 13.2. The selectivity of the inventive polymers is thus partly comparable, but at most 2.1 times worse than that of the prior art homopolymers. Weighing this slight loss of selectivity against the distinctly larger increase in the permeability by up to a factor of 81.5, the inventive polymers are found to embody a clear increase in permselectivity. The inventive polymers have a distinctly higher level of productivity for the gas pair O$_2$/N$_2$.

These results were also confirmed for CO$_2$/CH$_4$. An increase in the permeability by a factor of 71 (cf. Example 26 with Comparative Example 1 or 2 for methane) was achieved. However, the selectivity decreased at most by a factor of 4 (cf. Example 26 with comparative example).

EXAMPLE 42: PREPARING A HOLLOW FIBER MEMBRANE FROM A BLOCK COPOLYIMIDE SOLUTION OF EXAMPLE 9

A 27.5 wt % solution from Example 5 in DMF having a bulk viscosity of 65.9 Pa·s$^{-1}$ was thermostated to 50° C., devolatilized and filtered and gear pumped through a binary nozzle. The flow rate of the polymer solution was 337 g/h. While the polymer solution was conveyed in the exterior region of the binary nozzle, a mixture (bore solution) of 60% dimethylformamide and 40% water was conveyed on the inside in order to manufacture the hole in the hollow fibers. The flow rate of the bore solution was 110 ml/h. At a distance of 13 cm away from the nozzle, the hollow fiber entered warm water at 70° C. On the path between the nozzle and the coagulation bath, the hollow fiber was enveloped with a tube. A nitrogen stream of 1 l/min flowed through this tube after being preheated to 50° C. The fiber after the coagulation bath was pulled through a warm water wash bath at 70° C. and finally wound up at a speed of 50 m/min. Following an extraction with water for several hours, the hollow fibers were dipped into isopropanol. Following the exchange of solvents, the membranes were led at 70° C. through a drying sector and dried in about 40 seconds. During drying, the fiber was pulled once through a 0.3 wt % Sylgard 184 in isohexane solution and thereafter further dried. The membranes obtained contain about 2 wt % of residual water, ≤0.5 wt % of residual solvent (isopropanol, isohexane) and <0.1 wt % of residual DMF and were subsequently heated at a heating rate of 2° C./min to a temperature of 310° C. in pure N$_2$ (O$_2$ content <0.001% by volume) and subsequently left at the final temperature for 1 h. After the annealing operation, the fibers were brought to below 250° C. as quickly as possible (about 5-10° C./min) and then further cooled down to room temperature.

The hollow fiber membranes thus obtained had an O2 permeance of 46 GPU and an $O_2/N_2$ single gas selectivity of 7.8. A layer thickness of 83 nm was computed for the actively separating layer, based on $O_2$, from the following formula:

$$l_{HFM} = \frac{\text{permeability}}{\text{permeance}} * 1000$$

where the layer thickness lHFM is in nm, the permeability is in barrers (10-10 cm3(STP)·cm·cm-2·s-1·cmHg-1) and the permeance is in GPU (10-6 cm3(STP)·cm-2·s-1·cmHg-1). The permeance of hollow fiber membranes is determined as described in the methods of measurement section. The permeability, by contrast, is determined not on the hollow fiber membrane but on a foil of the same material, as described in the methods of measurement section. It must be noted in this connection that the permeability is a purely material property and/or polymer property and the permeance is a membrane property. Since the hollow fiber membrane is made from the same material as the foils, the intrinsic property of permeability—determined on a foil basis—can be utilized to determine the layer thickness of hollow fiber membranes.

A DMF solubility of 80% was determined for the hollow fiber membranes of this example. The strength and breaking extension of the fibers were 1.48 N and 17.7% respectively.

COMPARATIVE EXAMPLE 3: PREPARING A HOLLOW FIBER MEMBRANE FROM A P84HT SOLUTION OF WO 2011/009919 A1, EXAMPLE 7

The P84 HT solution, in DMF, obtained from Example 7 of WO 2011/009919 A1 was thermostated to 50° C., devolatilized and filtered and gear pumped through a binary nozzle. The flow rate was 324 g/h. While the polymer solution was conveyed in the exterior region of the binary nozzle, a mixture (bore solution) of 70% dimethylformamide and 30% water was conveyed on the inside in order to manufacture the hole in the hollow fibers. The flow rate of the bore solution was 120 ml/h. At a distance of 13 cm away from the nozzle, the hollow fiber entered warm water at 50° C. On the path between the nozzle and the coagulation bath, the hollow fiber was enveloped with a tube. A nitrogen stream of 1 l/min flowed through this tube after being preheated to 50° C. The fiber was pulled through the warm water wash bath and finally wound up at a speed of 50 m/min. Following an extraction with water for several hours, the hollow fibers were dipped into isopropanol. Following this, the membranes were led at 70° C. through a drying sector and dried in about 40 seconds. The membranes obtained contain less than 2 wt % of water, ≤0.5 wt % of residual solvent (isopropanol, hexane) and <0.1 wt % of residual DMF and were subsequently heated at a heating rate of 2° C./min to a temperature of 310° C. in pure $N_2$ ($O_2$ content <0.001% by volume) and subsequently left at the final temperature for 1 h. After the annealing operation, the fibers were brought to below 250° C. as quickly as possible (about 5-10° C./min) and then further cooled down to room temperature.

The membranes obtained had an $O_2$ permeance of 4.6 GPU and an $O_2/N_2$ single gas selectivity of 10.6. A separating layer thickness of 115 nm was computed. A DMF solubility of 70% was determined. The strength and breaking extension of the fibers were 2.04 N and 27.9% respectively.

COMPARATIVE EXAMPLE 4: PREPARING A HOLLOW FIBER MEMBRANE FROM A P84 TYPE 70 SOLUTION OF WO 2011/009919 A1, EXAMPLE 2

The P84 type 70 solution obtained from WO 2011/009919 A1, Example 2 was thermostated to 50° C., devolatilized and filtered and gear pumped through a binary nozzle. The flow rate of the polymer solution was 324 g/h. While the polymer solution was conveyed in the exterior region of the binary nozzle, a mixture (bore solution) of 70% dimethylformamide and 30% water was conveyed on the inside in order to manufacture the hole in the hollow fibers. The flow rate of the bore solution was 120 ml/h. At a distance of 13 cm away from the nozzle, the hollow fiber entered warm water at 50° C. On the path between the nozzle and the coagulation bath, the hollow fiber was enveloped with a tube. A nitrogen stream of 0.5 l/min flowed through this tube after being preheated to 50° C. The fiber was pulled through the warm water wash bath and finally wound up at a speed of 50 m/min. Following an extraction with water for several hours, the hollow fibers were dipped into isopropanol. Following this, the membranes were led at 70° C. through a drying sector and dried in about 40 seconds. The membranes obtained contain less than 2 wt % of water, 0.5 wt % of residual solvent (isopropanol, hexane) and <0.1 wt % of residual DMF and were subsequently heated at a heating rate of 2° C./min to a temperature of 290° C. in pure $N_2$ ($O_2$ content <0.001% by volume) and subsequently left at the final temperature for 1 h. After the annealing operation, the fibers were brought to below 250° C. as quickly as possible (about 5-10° C./min) and then further cooled down to room temperature.

The membranes obtained had an $O_2$ permeance of 2.0 GPU and an $O_2/N_2$ single gas selectivity of 6.7. A separating layer (based on $O_2$ thickness of 91 nm was computed. A DMF solubility of 70% was determined. The strength and breaking extension of the fibers were 2.16 N and 34.0% respectively.

The $O_2$ permeance of the hollow fiber membranes obtained is 10 times higher in Example 42 than in Comparative Example 3 and 23 times higher than in Comparative Example 4, in each of which the A blocks of the present invention were employed as homopolymers. This is particularly remarkable if only because there is but little difference between the thicknesses of the actively separating layers.

The invention claimed is:
1. A block copolyimide, comprising the blocks (A) and (B) having the following structures (Ia) and (Ib)

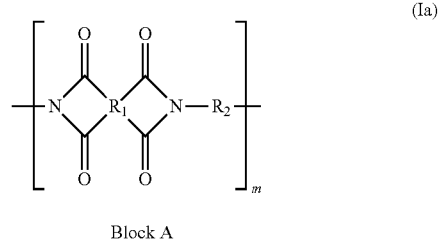

Block A

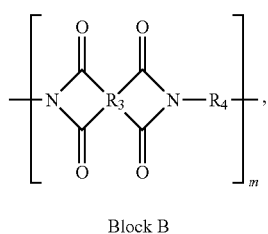

Block B (Ib)

wherein

R1 comprises either or both of the functional groups $R_1a$ or $R_1b$

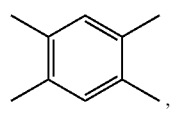

R1a

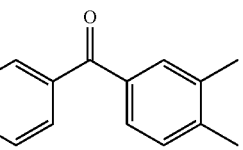

R1b

R2 comprises at least one of the functional groups $R_2a$, $R_2b$ or $R_2c$

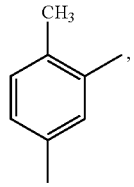

R2a

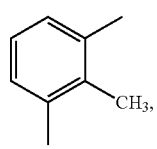

R2b

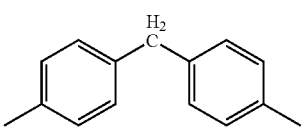

R2c

R3 comprises at least one of the functional groups $R_3a$, $R_3b$ or $R_3c$

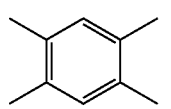

R3a

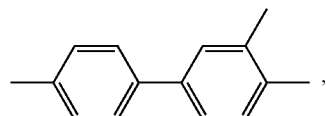

R3b

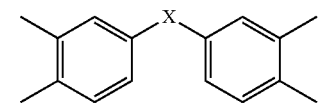

R3c where X =  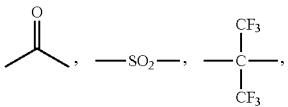

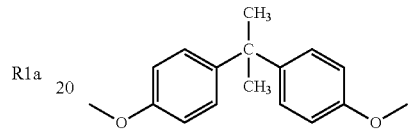

and R4 comprises at least one of the following functional groups $R_4a$, $R_4b$ or $R_4c$

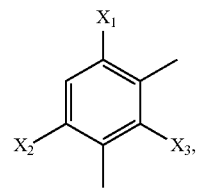

R4a

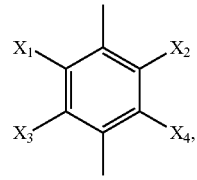

R4b

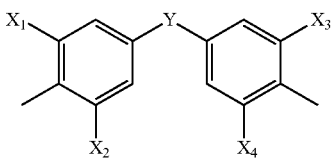

R4c where $X_1$, $X_2$, $X_3$ and $X_4$ are either H or $CH_3$ or alkyl radicals with $C_2$ to $C_4$ and
Y = —$CH_2$—, —$(CH_3)_2C$—, $SO_2$, —$(CF_3)_2C$—, —CO—, —COO—, —CONH—, —O— wherein at least one of the radicals $X_1$ to $X_4$, are equal to $CH_3$ or a $C_2$ to $C_4$ alkyl radical and the functional groups $R_1$ to $R_4$ are selected such that the blocks A and B have a differing composition, wherein block lengths n and m of blocks (A) and (B) are each from 5 to 1000, and wherein the block copolyimide is soluble in an aprotic dipolar solvent.

2. The block copolyimide according to claim 1, wherein the block lengths n and m of blocks (A) and (B) are each from 5 to 150, and/or the molecular weight $M_n$ of the block copolyimide is, based on polystyrene standards, in the range from 10,000 to 200,000 g/mol, and/or the molecular weight $M_w$ of the block copolyimide is in the range from 10,000 to 500,000 g/mol, and/or the polydispersity index is in the range from 1 to 10.

3. The block copolyimide according to claim 1, wherein the block (B) in isolated form is soluble in an aprotic dipolar solvent.

4. The block copolyimide according to claim 1, wherein $R_1$ consists in total to an extent >50 mol %, of groups $R_1a$ and $R_1b$ and also any further tetravalent, aromatic, functional groups, and/or $R_2$ consists in total to an extent >50 mol %, of groups $R_ea$, $R_2b$ and/or $R_2c$ and any further divalent, aromatic, functional groups, and/or $R_3$ consists in total to an extent >50 mol %, of groups $R_3a$, $R_3b$ and/or $R_3c$ and also any further tetravalent, aromatic, functional groups, and/or $R_4$ consists in total to an extent >50 mol %, of groups $R_4a$, $R_4b$ and/or $R_4c$ and any further divalent, aromatic, functional groups.

5. The block copolyimide according to claim 4, wherein $R_1$ consists of 0 to 100 mol % $R_1a$ and 0 to 100 mol % $R_1b$, wherein the mole percentages of the functional groups $R_1a$ and $R_1b$ are in each case chosen within the recited ranges such that they total 100 mol % of functional groups $R_1$, and/or $R_2$ consists of 0 to 100 mol % $R_2a$ and/or 0 to 100 mol % $R_2b$ and/or 0 to 100 mol % $R_2c$, wherein the mole percentages of the functional groups $R_2a$, $R_2b$ and $R_2c$ are in each case chosen within the recited ranges such that they total 100 mol % of functional groups $R_2$, and/or $R_3$ consists of 0 to 100 mol % $R_3a$ and/or 0 to 100 mol % $R_3b$ and/or 0 to 100 mol % $R_3c$, wherein the mole percentages of the functional groups $R_3a$, $R_3b$ and $R_3c$ are in each case chosen within the recited ranges such that they total 100 mol % of functional groups $R_3$ and/or $R_4$ consists of 0 to 100 mol % $R_4a$ and 0 to 100 mol % $R_4b$ and 0 to 100 mol % $R_4c$, wherein the mole percentages of the functional groups $R_4a$, $R_4b$ and $R_4c$ are in each case chosen within the recited ranges such that they total 100 mol % of functional groups $R_4$.

6. The block copolyimide according to claim 1, wherein:

block (A) consists of:

100 mol % $R_1b$, 64 mol % $R_2a$, 16 mol % $R_2b$ and 20 mol % $R_2c$, or 40 mol % $R_1a$, 60 mol % $R_1b$, 80 mol % $R_2a$ and 20 mol % $R_2b$, and block (B) consists of 40 to 60 mol % $R_3a$, 0 to 10 mol % $R_4b$, 60 to 30 mol % $R_3c$, 90 to 100 mol % $R_4a$, 0 to 10 mol % $R_0b$ and 0 to 10 mol % $R_0c$, or 50 mol % $R_3a$, 50 mol % $R_1c$ and 100 mol % $R_4a$, wherein the recited mole percentages relate to the functional groups $R_1$, $R_2$, $R_3$ and $R_4$ such that the amounts of the various units are each selected such that the sum total is 100 mol % for each of these groups.

7. A process for preparing a block copolyimide according to claim 1, comprising the following steps:

a. preparing an oligoimide having terminal anhydrides from at least one dianhydride of formula (II)

(II)

and at least one diamine of formula (III)

$$H_2N-R_4-NH_2 \quad \text{(III)}$$

wherein $R_3$ and $R_4$ are each as defined in claim 1, and b. reacting the oligo/polyimide of step a) with at least one dianhydride of formula (IV)

(IV)

and at least one diisocyanate (V)

$$OCN-R_2-NCO \quad \text{(V)}$$

wherein $R_1$ and $R_2$ are each as defined in claim 1, to form a block copolyimide.

8. The process according to claim 7, wherein step a) comprises the following subsidiary steps:

a1) preparing an oligoamide acid from at least one diamine of formula (III) and at least one dicarboxylic anhydride of formula (II) in an aprotic dipolar solvent, wherein the dicarboxylic anhydride is present in molar excess, a2) imidating the oligoamide acid, a3) precipitating the oligoimide of step a2)

a4) washing, and a5) drying, and/or conditioning.

9. The process according to claim 8, wherein the imidating in step a2) is effected thermally or chemically, wherein chemical imidizing is effected by adding a base and a water-withdrawing agent.

10. The process according to claim 9, wherein the base comprises tertiary organic amines and/or basic salts.

11. The process according to claim 7, wherein the step b) comprises the following subsidiary steps:

b1) preparing a solution of the oligoimide of step a) in an aprotic dipolar solvent together with PMDA and/or with BTDA and with a basic catalyst, and b2) adding at least one diisocyanate selected from the group consisting of 2,4-TDI, 2,6-TDI and 4,4'-MDI to form a block copolymer.

12. A process for preparing a block copolyimide according to claim 1, comprising the following steps:
(i) preparing an oligoimide having terminal anhydrides from at least one dianhydride of formula (IV)

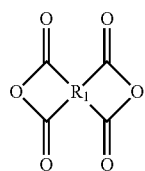
(IV)

and at least one diisocyanate of formula (V)

OCN—$R_2$—NCO (V)

wherein $R_1$ and $R_2$ are each as defined in claim 1, and
(ii) preparing a polyimide/polyamide acid block copolymer by reacting block (A) as obtained from step (i) with at least one dianhydride of formula (II)

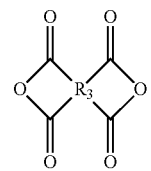
(II)

and at least one diamine of formula (III)

$H_2N$—$R_4$—$NH_2$ (III), wherein $R_3$ and $R_4$ are each as defined in claim 1,
and/or a block (B) having terminal amino groups, prepared from at least one dianhydride of formula (II) and at least one diamine of formula (III),
and
(iii) chemically imidating the polyimide/polyamide acid copolymer formed in step iii).

13. An asymmetrically integral hollow fiber membrane or asymmetrically integral flat sheet membrane prepared from a block copolyimide according to claim 1.

14. A hollow fiber membrane module comprising an asymmetrically integral hollow fiber membrane according to claim 13.

15. A process for separation of gases, comprising separating a gas mixture with
an asymmetrically integral hollow fiber membrane or asymmetrically integral flat sheet membrane according to claim 13.

16. A device for separation of gases, comprising an asymmetrically integral hollow fiber membrane or asymmetrically integral flat sheet membrane according to claim 13.

17. An asymmetrically integral hollow fiber membrane or asymmetrically integral flat sheet membrane, prepared from a solution obtained by the process according to claim 7.

18. The process according to claim 7, wherein step b) is carried out using a tertiary organic amine or a basic salt as catalyst.

19. The block copolyimide according to claim 1, wherein R4 comprises at least one $R_4c$ functional group.

* * * * *